United States Patent
Kelsey

(10) Patent No.: US 11,904,590 B2
(45) Date of Patent: *Feb. 20, 2024

(54) STRETCHABLE LAMINATES

(71) Applicant: W. L. Gore & Associates, Inc., Newark, DE (US)

(72) Inventor: William Kelsey, Newark, DE (US)

(73) Assignee: W.L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,499

(22) Filed: Nov. 3, 2022

(65) Prior Publication Data
US 2023/0091015 A1   Mar. 23, 2023

Related U.S. Application Data

(62) Division of application No. 16/337,754, filed as application No. PCT/US2017/054888 on Oct. 4, 2017, now Pat. No. 11,518,139.
(Continued)

(51) Int. Cl.
*B32B 5/12* (2006.01)
*B32B 5/02* (2006.01)
(Continued)

(52) U.S. Cl.
CPC ............ *B32B 5/12* (2013.01); *B32B 5/024* (2013.01); *B32B 5/16* (2013.01); *B32B 5/245* (2013.01);
(Continued)

(58) Field of Classification Search
CPC ......... B32B 5/26; B32B 5/024; B32B 27/322; B32B 5/16; B32B 5/12; B32B 5/24;
(Continued)

(56) References Cited

U.S. PATENT DOCUMENTS 4,194,041 A * 3/1980 Gore .............. D06N 3/183
2/87
6,057,024 A   5/2000 Fitts
(Continued)

FOREIGN PATENT DOCUMENTS

CN    105407752 A    3/2016
EP    1 755 881 A2   2/2007
(Continued)

OTHER PUBLICATIONS

International Search Report and Written Opinion from International Application No. PCT/US2017/054888 dated Feb. 6, 2018.

*Primary Examiner* — Lynda Salvatore
(74) *Attorney, Agent, or Firm* — GREENBERG TRAURIG, LLP

(57) ABSTRACT

The present invention provides stretchable laminates with a flat appearance on the visible surface. The laminates comprise a textile layer, a functional layer, and a plurality of elastic fibers. The plurality of elastic fibers are in a substantially parallel arrangement and the internal distance between adjacent fibers does not exceed the maximum fiber spacing, which depends on laminate thickness in a stretched state. Also provided are garments and footwear comprising the stretchable laminates and methods of producing the stretchable laminates.

13 Claims, 18 Drawing Sheets

Related U.S. Application Data

(60) Provisional application No. 62/403,805, filed on Oct. 4, 2016.

(51) Int. Cl.

| | |
|---|---|
| *B32B 5/16* | (2006.01) |
| *B32B 5/24* | (2006.01) |
| *B32B 5/26* | (2006.01) |
| *B32B 7/12* | (2006.01) |
| *B32B 27/32* | (2006.01) |
| *C02F 1/00* | (2023.01) |
| *C02F 1/02* | (2023.01) |
| *E03B 7/07* | (2006.01) |
| *E03C 1/02* | (2006.01) |
| *F24F 12/00* | (2006.01) |
| *H02G 3/08* | (2006.01) |
| *H02G 3/16* | (2006.01) |
| *H02G 3/18* | (2006.01) |
| *H02S 99/00* | (2014.01) |
| *A62C 35/00* | (2006.01) |
| *E03C 1/00* | (2006.01) |

(52) U.S. Cl.
CPC ............... *B32B 5/26* (2013.01); *B32B 7/12* (2013.01); *B32B 27/322* (2013.01); *C02F 1/001* (2013.01); *C02F 1/02* (2013.01); *E03B 7/074* (2013.01); *E03C 1/02* (2013.01); *E03C 1/021* (2013.01); *F24F 12/001* (2013.01); *F24F 12/006* (2013.01); *H02G 3/08* (2013.01); *H02G 3/083* (2013.01); *H02G 3/16* (2013.01); *H02G 3/18* (2013.01); *H02S 99/00* (2013.01); *A62C 35/00* (2013.01); *B32B 2262/0207* (2013.01); *B32B 2262/0246* (2013.01); *B32B 2262/0253* (2013.01); *B32B 2262/0261* (2013.01); *B32B 2262/0276* (2013.01); *B32B 2262/0292* (2013.01); *B32B 2262/04* (2013.01); *B32B 2262/062* (2013.01); *B32B 2262/08* (2013.01); *B32B 2264/0257* (2013.01); *B32B 2307/51* (2013.01); *B32B 2307/538* (2013.01); *B32B 2307/724* (2013.01); *B32B 2307/7265* (2013.01); *B32B 2307/732* (2013.01); *C02F 2201/005* (2013.01); *C02F 2201/009* (2013.01); *E03C 2001/005* (2013.01); *F24F 2203/021* (2013.01); *F24F 2221/02* (2013.01); *F24F 2221/18* (2013.01); *F24F 2221/183* (2013.01); *F24F 2221/54* (2013.01); *F24F 2221/56* (2013.01); *Y02B 30/56* (2013.01); *Y02W 10/37* (2015.05)

(58) Field of Classification Search
CPC ............... B32B 7/12; B32B 2307/732; B32B 2262/0276; B32B 2264/0257; B32B 2262/04; B32B 2307/724; B32B 2262/08; B32B 2262/0253; B32B 2262/0292; B32B 2307/7265; B32B 2262/0207; B32B 2262/0246; B32B 2307/538; B32B 2437/00; B32B 2262/062; B32B 2262/0261; B32B 2307/51; F24F 12/001; F24F 2221/183; F24F 2203/021; F24F 2221/54; F24F 2221/568; F24F 2221/18; F24F 2221/02; E03B 7/074; H02G 3/08; H02G 3/16; H02G 3/18; H02S 99/00; C02F 1/028; C02F 1/001; C02F 2201/005; C02F 2201/009; E03C 1/02; E03C 1/021; E03C 2001/005; Y02B 30/56; Y02B 10/10; A62C 35/00; Y02W 10/37; Y02E 10/50

See application file for complete search history.

(56) References Cited

U.S. PATENT DOCUMENTS

| | | | |
|---|---|---|---|
| 6,964,720 B2 | 11/2005 | Schmitz | |
| 7,008,497 B2 | 3/2006 | Hitoshi | |
| 7,968,479 B2 | 6/2011 | Lassig | |
| 8,153,238 B2 | 4/2012 | Hall | |
| 8,709,579 B2 | 4/2014 | Hoenigmann | |
| 11,518,139 B2 * | 12/2022 | Kelsey | ............ B32B 5/26 |
| 2006/0148358 A1 | 7/2006 | Biggs | |
| 2008/0120761 A1 | 5/2008 | Yang et al. | |
| 2009/0077724 A1 * | 3/2009 | Courtney | ............ A41D 31/102 |
| | | | 2/457 |
| 2015/0351474 A1 * | 12/2015 | Farmer | ............ D06M 17/00 |
| | | | 2/243.1 |

FOREIGN PATENT DOCUMENTS

| | | |
|---|---|---|
| EP | 2 221 172 A1 | 8/2010 |
| JP | 2017-061064 A | 3/2017 |
| WO | WO-00/20202 A1 | 4/2000 |
| WO | WO-00/37003 A2 | 6/2000 |
| WO | WO-01/62196 A1 | 8/2001 |
| WO | WO-2005123377 | 12/2005 |
| WO | WO-2014/105778 A1 | 7/2014 |

* cited by examiner

| Sample # | Type | Face Textile | Thickness, stretched (mm) | Average MVTR (g/m^2/24hr) | Suter (Pass/Fail) | % Elongation | % Recovery |
|---|---|---|---|---|---|---|---|
| 1 | Inventive | MI187R | 0.252 | 13305.9 | Pass/Pass/Pass | 60.6 | 96.9 |
| 2 | Comparative | MI187R | 0.238 | 12199.9 | Pass/Pass/Pass | 55.6 | 96.3 |
| 3 | Inventive | US440 | 0.470 | 12490.5 | Pass/Pass/Pass | 34.4 | 96.5 |
| 4 | Comparative | US440 | 0.497 | 10838.9 | Pass/Pass/Pass | 61.4 | 97.5 |
| 5 | Comparative | NUER058P | 0.388 | 11830.2 | Pass/Pass/Pass | 70.1 | 97.6 |
| 6 | Inventive | PIQE001MO | 0.757 | 12359.8 | Pass/Pass/Pass | 74.9 | 93.3 |

FIG. 17

STRETCHABLE LAMINATES

PRIORITY CLAIM

This application is a divisional of U.S. patent application Ser. No. 16/337,754 filed on Mar. 28, 2019, now U.S. Pat. No. 11,518,139, which is a national phase filing under 35 USC 371 of International Application No. PCT/US2017/054888 filed Oct. 3, 2017, which claims priority to U.S. Provisional Application No. 62/403,805 filed on Oct. 4, 2016, which are incorporated herein by reference in their entirety.

TECHNICAL FIELD OF THE INVENTION

Generally, the present invention relates to stretchable laminates. More specifically, this invention relates to laminates of textile and functional layers having a flat appearance on the surface of the textile opposite the functional layer when the laminate is in a non-stretched state.

BACKGROUND OF THE INVENTION

Waterproof, vapor-permeable laminates with stretch characteristics are highly desirable for incorporation into articles such as garments. Stretch characteristics are desired where flexibility of movement is needed for the garment or to achieve a form-fitting garment. Without being tailor made, a form-fitting garment uses stretch characteristics for a closer fit without adversely affecting the wearer's comfort. Gloves, mittens, socks, stockings, ski wear, running suits, athletic garments and medical compresses are some examples of such garments that benefit from form-fitting characteristics.

Currently, stretchability in waterproof applications may be achieved by using elastic or stretch textiles laminated to a functional layer that provides waterproofness and vapor-permeability. The elastic or stretch textiles may be made from elastic materials or are coated with an elastic material to impart stretch to the textile. By utilizing elastic or stretch outer textiles, these laminates are generally able to achieve a flat surface appearance. For example, US Pub. No. 2009/0227165 discloses a stretch composite fabric comprising a sintered expanded porous polytetrafluoroethylene film and a stretch cloth laminated to each other while maintaining a flat state. US Pub. No. 2013/0291293 discloses waterproof, breathable, stretch-recoverable composites that are utilizable within footwear assemblies and exhibit stretchability in at least one direction by at least 35% at 4 lbs force and exhibit at least 80% recovery.

U.S. Pat. No. 5,804,011 discloses a stretchable layered fabric laminate which is air impermeable and waterproof while being permeable to water vapor. The stretchable fabric laminate includes a stretchable composite material layer consisting of a hydrophobic protective layer of a porous polymeric material on each side of a layer of hydrophilic water-vapor-permeable synthetic polymer. The composite material layer is laminated to at least one layer of stretchable fabric. The stretchable layered fabric laminate has excellent stretch and recovery properties in both machine and transverse directions, and is useful for the manufacture of form-fitting articles of protective clothing and other end uses. In addition, conventional stretchable laminates incorporating non-elastic textiles tend to have a rough or uneven appearance in the non-stretched state, leading to poor aesthetics and low customer acceptance. For example, surface puckers increase the thickness of the laminate and can make the laminate more bulky and difficult to wear or to incorporate in small applications, such as a shoe tongue. In the non-stretched state or relaxed state, the outer surface of a conventional stretchable laminate incorporating non-elastic materials has bunching, rippling, buckling, and/or puckering. U.S. Pat. No. 6,713,415 discloses a laundry-durable unitary composite stretchable puckered fabric and processes for producing the fabric, based on two nonwoven outer layers and a pre-stretched inner layer of elastomeric fibers of at least 400 decitex and at least eight threadlines/inch.

A variety of attempts have been made to improve stretchable, breathable laminates. Although, improvements have been made, it has not been possible to create flat laminates incorporating non-elastic textiles that are free from bunching, rippling, buckling, and/or puckering. In addition, many of these fabrics obtain varying degrees of waterproofness, breathability, stretch, stretch-recovery, and comfort. Continued efforts are needed, however, to provide the desired properties for garments and/or footwear while having a surface that has an aesthetic appearance in a non-stretched state and expanding the types of textiles, such as non-elastic or relatively inelastic textiles, that may be used in stretchable laminates.

BRIEF SUMMARY OF THE INVENTION

In some embodiments, the disclosure relates to a stretchable laminate comprising a textile layer comprising a non-elastic material having a first surface and a second surface; a functional layer disposed on at least one surface of the textile layer; and a plurality of elastic fibers, having an adjacent fiber spacing distance, disposed in a substantially parallel arrangement on at least one of the textile and/or the functional layer wherein at least 80% of the elastic fibers have an adjacent spacing that is less than the maximum fiber spacing, wherein the maximum fiber spacing, in millimeters, is equal to or less than 3.0 times the thickness of the stretchable laminate in a stretched state, in millimeters; and wherein:
  i) the plurality of elastic fibers are disposed between the textile layer and the functional layer;
  ii) the functional layer is disposed on the first surface of the textile layer and the plurality of elastic fibers are disposed on a side of the functional layer opposite to the textile layer; or
  iii) the functional layer is disposed on the second surface of the textile layer and the plurality of elastic fibers is disposed on the first surface of the textile layer.

In other embodiments there is provided a stretchable laminate and garments made therefrom comprising a textile layer comprising a non-elastic material having a first surface and a second surface; a functional layer disposed on at least one surface of the textile layer; and a plurality of elastic fibers disposed in a substantially parallel arrangement on at least one of the textile layer and/or the functional layer, wherein the surface of the textile layer opposite the functional layer, in a non-stretched state, has an average normalized surface roughness (Ra) of less than or equal to 25 micrometers, wherein:
  i) the plurality of elastic fibers are disposed between the textile layer and the functional layer;
  ii) the functional layer is disposed on the first surface of the textile layer and the plurality of elastic fibers are disposed on a side of the functional layer opposite to the textile layer; or
  iii) the functional layer is disposed on the second surface of the textile layer and the plurality of elastic fibers is disposed on the first surface of the textile layer.

In some embodiments, the maximum distance between adjacent fibers does not exceed the maximum fiber spacing of the stretchable laminate. In some embodiments, the surface of the textile opposite the functional layer is substantially free of buckling or non-uniform buckling.

In another embodiment the elastic fibers may be disposed in a substantially parallel arrangement between two functional layers, with or without textile layer(s), wherein the surface of the functional layer opposite the plurality of elastic fibers is substantially free of buckling. In other embodiments, a stretchable laminate comprises a plurality of elastic fibers disposed in a substantially parallel arrangement on a first functional layer and optionally further comprising a second functional layer wherein the second functional layer is disposed on the first functional layer with the elastic fibers disposed between the first and second functional layers or wherein the second functional layer is disposed on the first functional layer on the side opposite the plurality of elastic fibers; and wherein the plurality of elastic fibers have a fiber density, or spacing of fibers, of at least 7.9 fibers per centimeter, e.g., at least 8.0 fibers per centimeter or at least 10.0 fibers per centimeter. In some embodiments, a stretchable laminate may comprise a textile layer comprising a material having a first surface and a second surface; a plurality of elastic fibers disposed in a substantially parallel arrangement between a first functional layer and a second functional layer, where the first functional layer or the second functional layer is disposed on the first surface of the textile layer.

In yet another embodiment the elastic fibers may be disposed in a substantially parallel arrangement on a side of the functional layer, specifically, on the opposite side of the functional layer from the textile layer. In some embodiments, a stretchable laminate comprises a textile layer comprising a material having a first surface and a second surface; and a functional layer having a plurality of elastic fibers disposed in a substantially parallel arrangement disposed on a side of the functional layer, whereinn the functional layer is disposed between the textile layer and the plurality of elastic fibers.

In further embodiments the elastic fibers may be disposed in a substantially parallel arrangement on the first surface of the textile layer, and the functional layer disposed on the second surface of the textile. The stretchable laminate comprises a textile layer comprising a material having a first surface and a second surface; a plurality of elastic fibers disposed in a substantially parallel arrangement on the first surface of the textile layer; and a functional layer disposed on the second surface of the textile layer.

In still further embodiments the functional layer or the textile layer may be omitted. In one such embodiment, stretchable laminate may comprise a textile layer comprising a material having a first surface and a second surface; a plurality of elastic fibers disposed in a substantially parallel arrangement on the first surface of the textile layer. In other embodiments, the textile layer may be omitted. In another embodiment, a stretchable laminate may comprise a functional layer; wherein a plurality of elastic fibers is disposed in a substantially parallel arrangement on a surface of the functional layer, wherein the plurality of elastic fibers have an internal distance that is less than or equal to the maximum fiber spacing based on the laminate thickness, as measured in the stretch state. In some embodiments, the fiber density is at least 7.9 fibers per centimeter.

In some embodiments, the denier of the elastic fibers is 400 denier or less. In some cases, the denier is 300 denier, 200 denier, 150 denier, or a denier less than 150 denier or less, as described herein. In some examples, the functional layer has a thickness that is less than 0.06 mm, e.g., less than 0.05 mm, less than 0.04 mm, or less than 0.03 mm.

In another embodiment there is provided garments comprising the laminates disclosed herein. In one embodiment, the laminate is used in an elbow panel, a shoulder region, a side panel, or a shoe tongue.

BRIEF DESCRIPTION OF THE DRAWINGS

The advantages of this invention will be apparent upon consideration of the following detailed disclosure of the invention, especially when taken in conjunction with the accompanying drawings wherein:

FIG. 17 is a table of properties of laminates of the invention and comparative laminates.

DETAILED DESCRIPTION OF THE INVENTION

Figure 1B:
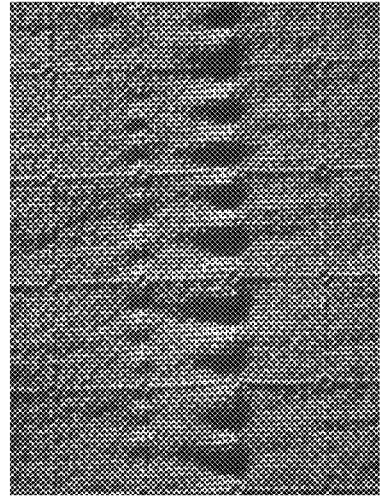
FIG. 1B is a photograph of a stretchable laminate having a buckled surface in a non-stretched state.

Disclosed are stretchable laminates and in some embodiments stretchable laminates having a flat appearance in a non-stretched state. In general, the stretchable laminates of the present invention comprise a textile layer and/or a functional layer, and a plurality of elastic fibers. Incorporating elastic fibers separate from the textile layer, which may be a non-elastic textile layer, provides for stretchable laminates. The stretchable laminates have elasticity in the direction of the elastic fibers. Several arrangements of the layers described herein are also within the scope of the present invention. In addition, other layers, such as adhesive layers or backing layers, may be incorporated into the stretchable laminates of the present invention.

In some embodiments, the present disclosure provides stretchable laminates comprising a textile layer comprising a material having a first surface and a second surface, a functional layer disposed on at least one surface of the textile layer, and a plurality of elastic fibers disposed in a substantially parallel arrangement on at least one of the textile layer and/or the functional layer. In some embodiments, the plurality of elastic fibers are disposed between the textile layer and the functional layer. In other embodiments, the functional layer is disposed on the first surface of the textile layer and the plurality of elastic fibers are disposed on a side of the functional layer opposite the textile layer. In still further embodiments, the functional layer is disposed on the second surface of the textile layer and the plurality of elastic fibers is disposed on the first surface of the textile layer. In other embodiments, the present disclosure provides stretchable laminates comprising a plurality of elastic fibers disposed in a substantially parallel arrangement on a first functional layer; optionally further comprising a second functional layer wherein the second functional layer is disposed on the first functional layer with the elastic fibers disposed between the first and second functional layers or wherein the second functional layer is disposed on the first functional layer on the side opposite the plurality of elastic fibers; and wherein the plurality of elastic fibers have a fiber density of at least 7.9 fibers per centimeter. The second functional layer may be chosen independently from the first functional layer and can be chosen from the same materials as disclosed for the first functional layer. In still further embodiments, the present disclosure provides a stretchable laminate comprising a first textile layer having a first surface and a second surface, a second textile layer disposed on at least one surface of the first textile layer, and a plurality of elastic fibers disposed in a substantially parallel arrangement between the first and second textile layers or disposed on at least one of the first or second textile layers. For the purposes of this invention, "on" is intended mean that at least a portion of one layer, for example, the textile layer, covers at least a portion of the adjacent layer, for example, the functional layer.

Figure 1A:
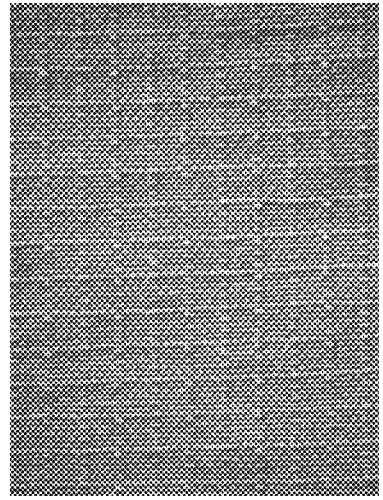
FIG. 1A is a photograph of a stretchable laminate having a flat appearance in a non-stretched state according to embodiments of the present invention.

Advantageously, the embodiments of the present invention may provide a flat appearance on the textile surface of the laminate opposite the functional layer leading to an aesthetic appearance. This eliminates undesired bunching, rippling, buckling, and/or puckering on the surface which detracts from the aesthetic appearance. In particular for form-fitting garments, the flat appearance is particularly appealing. A flat appearance refers to the textile surface of the laminate opposite the functional layer. In some garment embodiments, this is the surface of the laminate which is facing the environment and is not next to the wearer, where the texture of the textile is visible without introducing areas of non-conformity that causes undesired bunching, rippling, buckling, and/or puckering on the surface. In other garment embodiments, the functional layer may be the outer layer which is facing the environment and is not next to the wearer. In embodiments where the functional layer is the layer facing the environment, the textile surface may be an inner layer, that is adjacent the skin or other clothing of the wearer without introducing bunching, rippling, buckling, and/or puckering on the surface which may cause an unpleasant sensorial feel to the wearer. Bunching, rippling, buckling, and/or puckering, for the purposes of this disclosure, are non-conformities that cause undulations on the surface of the textile that is opposite the functional layer that are different from the texture of the textile layer prior to the formation of the laminate. For instance, FIG. 1A is an exemplary laminate according to the embodiments of the present invention where the surface of the textile layer opposite the functional layer has no visible buckling, whereas a laminate having unacceptable buckling is shown in FIG. 1B. As described herein, the buckling in FIG. 1B is caused by the inadequate arrangement of the elastic fibers. Embodiments of the present invention achieve a flat appearance by providing an arrangement of elastic fibers that does not cause bunching, rippling, buckling, and/or puckering on the surface of the textile layer that is opposite the functional layer.

Determining a flat appearance may vary depending on the type of textile and the layers of the laminate. In general, each textile has a natural surface texture. The laminates described herein achieve a flat appearance that does not significantly alter the natural surface texture of the textile, for example, the natural surface texture of the textile prior to the formation of the laminate. In one embodiment, the surface of the textile layer opposite the functional layer in a non-stretched state has an average normalized surface roughness (Ra) of less than or equal to 25 micrometers, e.g., less than or equal to 20 micrometers, less than or equal to 15 micrometers, less than or equal to 10 micrometers, or less than or equal to 5 micrometers. In terms of ranges, the average normalized Ra may be from 1 to 25 micrometers, e.g., from 5 to 25 micrometers, or from 10 to 20 micrometers. By having an average normalized Ra of less than or equal to 25 micrometers, the textile surface is substantially free of buckling and other non-conformities, for example, puckering. In some embodiments, the maximum normalized surface roughness (Ra) is no more than 50% larger than the average normalized surface roughness (Ra). In other embodiments, the surface of the textile layer has a maximum normalized surface roughness (Ra) of less than or equal to 25 micrometers.

The flatness of a surface can be assessed by profilometery. Briefly, profilometery measures the surface topography of a laminate swatch. The surface topography measurement may be normalized to account for the natural surface roughness of the textile layers. The normalized surface roughness (Ra) may then be calculated from the normalized surface topography data. For instance, a tweed or fleece may have a natural surface roughness with more texture than a plain weave nylon. The normalized Ra uses a filter window of two feature lengths as described in the test procedures. When the normalized Ra becomes greater than 25 micrometers the occurrence of non-conformities increases, which leads to a non-flat appearance and poor aesthetics. As used herein, the phrase "substantially free of buckling" means that the normalized Ra is less than or equal to 25 micrometers.

Figure 2:
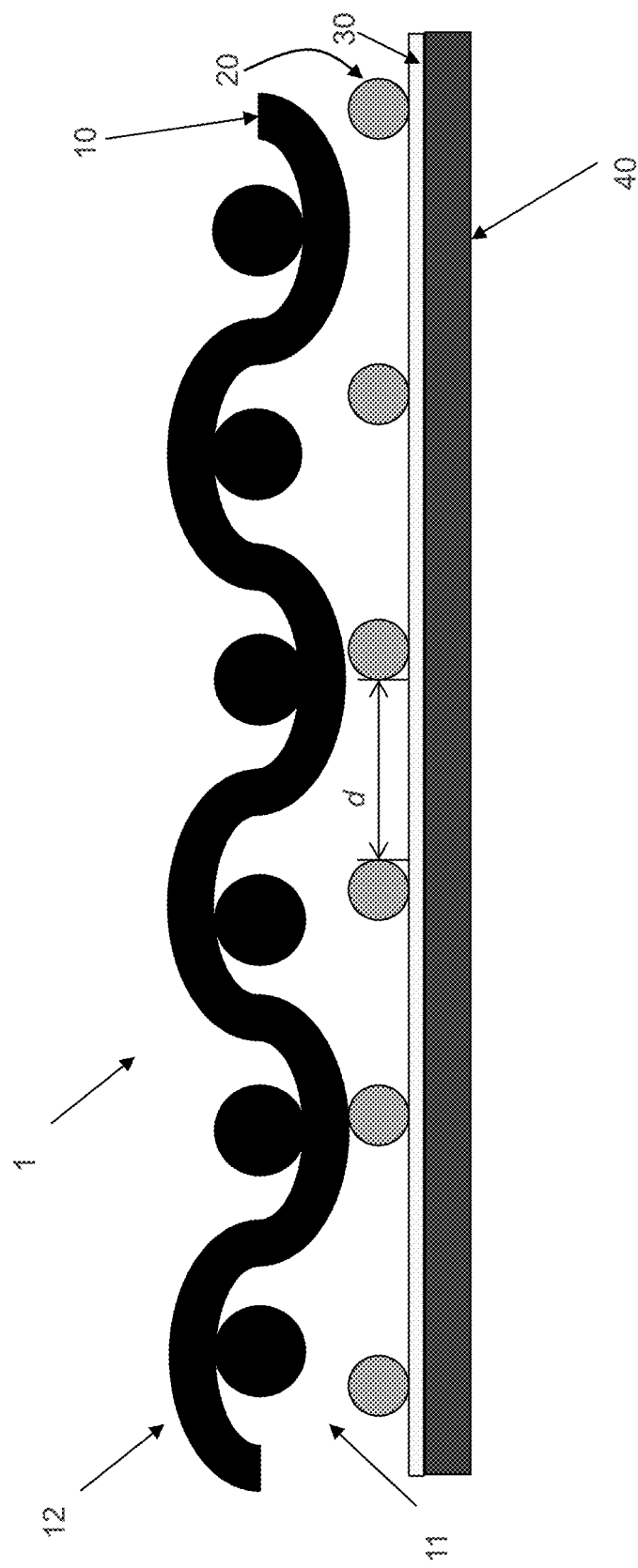
FIG. 2 is a schematic representation of a cross-section of a stretchable laminate having a flat surface in a non-stretched state according to embodiments of the present invention.

As shown in FIG. 2, laminate 1 comprises a textile layer 10, plurality of elastic fibers 20 and a functional layer 40. The textile layer 10 has a first surface 11 and a second surface 12. The second surface 12 is the surface that is opposite the functional layer 40. A functional layer 40 is disposed on the first surface 11 of the textile layer 10. Between the textile layer 10 and functional layer 40 there is disposed a plurality of elastic fibers 20. Each of the elastic fibers 20 are disposed in a substantially parallel arrangement with respect to each other and have an internal spacing of d. An adhesive layer 30 is disposed between the functional layer 40 and the plurality of elastic fibers 20. Adhesive layer 30 also bonds the textile layer 10 to the functional layer 40. The thickness of the laminate 1 may vary depending on the textile layer 10 and number of layers. As discussed herein the internal distance d between elastic fibers 20 may be dependent upon on the thickness of the laminate 1. In some embodiments, the thickness of the laminate 1 in a stretched state is from 0.05 to 4 millimeters, e.g., from 0.1 to 2 mm, or from 0.1 to 1 mm.

The present invention may be useful for laminates 1 that incorporate textile layers 10 that are made of non-elastic or relatively inelastic materials. In some embodiments, the laminates 1 may incorporate textiles having elastic materials and the elastic fibers 20 may further increase the elasticity of the laminate 1. Non-elastic materials may include materials that are not coated with an elastic material, or that do not comprise elastic materials woven or knitted into the textile layer. Thus, in some embodiments, the material of the textile layer 10 is uncoated and is unfilled with any elastomer or other material that would impart elasticity. In one embodiment, the material of textile layer 10 has an elasticity that is less than the elasticity of the elastic fibers 20. For example, the elastic fibers may have an elasticity that is at least 1.5× greater than the textile layer, e.g., at least 2×, at least 3× or at least 4×. In certain embodiments, textile layer 10 may be made of a non-elastic material so that textile layer 10 independent of the stretch characteristics of the laminate 1 has an elongation of less than or equal to 15%, as measured according to ASTM test method D 5035-06. In other embodiments, the elongation of the textile layer may be less than or equal to 10%, or less than or equal to 5%.

Textile layer 10 may be a woven layer, knitted layer, or non-woven layer. The term "woven" may include any textile structure made up with weft and warp yarns or filaments. The term "knit" is to be understood broadly, in particular including any forms of warp knits and circular knits, but also covering any other configurations where a textile structure is produced by wrapping one or more yarns or filaments such as to form loops. Thus, a knit as used herein may also cover configurations that might be referred to as braided structures. As shown in FIG. 2, textile layer 10 is a woven layer. In some embodiments, textile layer 10 may be a woven layer or knitted layer. Depending on the pattern, knitted layers may inherently have some stretch, but may still be made of non-elastic materials. Knitted materials may be knitted from yarns that are non-elastic yarns, or from yarns that do not comprise an elastic coating. In some embodiments, a second or subsequent textile layer may be used, wherein each second or subsequent textile layer is independently chosen from the textile layers given above.

In some embodiments, the material of the textile layer 10 may be a natural fiber, or polymer fibers, or a blend of these fibers. Natural fibers include, for example, cotton, silk, cellulose, and/or wool. Polymer fibers include, for example, polyamides, polyolefins, polyacrylates, polyesters, polyurethanes, fluoropolymers, and copolymers thereof. In some embodiments, at least a portion of the material of the textile layer 10 can be a flame or fire retardant textile material, for example, aromatic polyamides, NOMEX® poly-metaphenylene isophthalamide, flame resistant (FR) cotton, polybenzimidazole (PBI), polybenzoxazole (PBO), FR rayon, modacrylic, modacrylic blends, carbon fibers, fiberglass, polyacrylonitrile, polytetraflurorethylene and blends thereof. In some embodiments, the textile layer 10 is a polyester or polyamide, such as a nylon. The material weight of the textile layer 10 may vary from 15 and 500 grams/square meter (g/m$^2$), or any material weight between 15 and 500 g/m$^2$. In other embodiments, the material weight of the textile layer can be 15, 16, 17, 18, 19, 20, 25, 30, 35, 40, 45 or 50 and up to 400, 425, 450, 475 or 500 g/m$^2$. In other embodiments, lighter or heavier weight materials may also be used. The thickness of the textile layer 10 may also vary and is generally from 0.05 to 4 mm, e.g., from 0.1 to 2 mm, or from 0.1 to 1 mm.

In some embodiments, there may be an abrasion coating on the surface 12 of the textile layer 10 that is opposite the functional layer. The abrasion coating may be continuous or discontinuous. In certain embodiments, the abrasion coating may comprise one or more layers of silicone, polyamide, polyester, epoxy, polyolefin or polyurethane. The abrasion coating may be applied in a manner that does not impair the waterproofness and breathability of the laminate 1.

The functional layer 40 can be used to impart breathability and allow moisture vapor transmission while providing water impermeability. In one embodiment, the functional layer 40 may be a porous membrane or non-porous membrane. In another embodiment, the functional layer 40 could be a barrier to chemical gases, liquids and/or particulate. A "membrane" as used herein is a barrier or film permeable to water vapor or moisture, but having waterproof characteristics. In some embodiments, the membrane has undergone further processing, such as surface coatings, imbibed coatings, node and fibril coatings, etc., and may also be referred to as a film. The membrane or film is considered to have waterproof characteristics in cases where the requirements specified in DIN EN 343 (2010) are met, i.e. a test of the liquid water resistance with respect to hydrostatic water pressure according to EN 20 811 (1992) yields a liquid water resistance (Wp) of 8000 Pa, or more.

In some embodiments, the functional layer 40 and any second or subsequent functional layer, if present, comprises at least one of a polyurethane, a copolyether-ester, a polyolefin, a polyester, a fluoropolymer, or a combination thereof. Suitable fluoropolymers include, for example, polytetrafluoroethylene (PTFE), polyvinylidene fluoride (PVDF), tetrafluoroethylene-hexafluoropropylene copolymer (FEP), and tetrafluoroethylene-(perfluoroalkyl) vinyl ether copolymer (PFA). In some embodiments, the functional layer(s) may be an expanded polytetrafluoroethylene (ePTFE) membrane. Porous membranes that can be used include, for example, one or more layers of ePTFE membrane made in accordance with U.S. Pat. No. 7,306,729 by Bacino et al., U.S. Pat. No. 3,953,566 by Gore, U.S. Pat. No. 5,476,589 by Bacino, U.S. Pat. No. 5,183,545 by Branca et al., U.S. Pat. No. 4,902,423 Bacino, each of which is incorporated by reference in its entirety. In certain embodiments, the functional layer(s) may include a copolymer of tetrafluoroethylene (TFE) and one or more monomers is vinylidene difluoride (VDF), hexafluoropropylene (HFP), chlorotrifluoroethylene (CTFE), ethylene, vinylidene fluoride (VF), perfluoroalkoxy (PFA), perfluoroether, and trifluoroethylene, or combinations thereof. Alternatively, functional layer 40 may comprise a monolithic membrane, in particular made from a hydrophilic polymer, like polyurethane and/or or polyether-polyester. In some embodiments, the stretchable laminates can comprise a second or subsequent functional layer wherein each second or subsequent functional layer can be independently chosen from the functional layers given above.

Similar to the textile material, some of the functional layers 40 may have an elasticity less than the elasticity of the elastic fibers 20. In particular ePTFE may have relatively inelastic characteristics. Although the elasticity of the functional layer 40 that used ePTFE may be improved by imbibed elastomers, this requires an additional step to make the functional layer 40. Further, the imbibing process is not necessary and the embodiments can use functional layers 40 regardless of whether an elastomer has been imbibed therein.

To achieve good water vapor permeability while still providing sufficiently waterproof characteristics, in some embodiments, the functional layer can be a porous membranes having a mean flow pore size from 0.05 μm to 0.5 μm, particularly from 0.1 μm to 0.5 μm; and more particularly from 0.2 μm to 0.45 μm. In other embodiments, the functional layer may be a breathable polyurethane film, in which case there is no porosity. In still other embodiments, the functional layer could be both non-breathable and non-porous, such as in a chemical barrier application that is useful for industrial or military grade garments.

When a functional layer 40 is incorporated into the laminate, the laminate may have a Moisture Vapor Transmission Rate (MVTR) according to DIN EN ISO 15496 (2004) of at least 3000 g/m$^2$/24 hr, e.g., at least 6000 g/m$^2$/24 hr, at least 8000 g/m$^2$/24 hr, or at least 12000 g/m$^2$/24 hr, and may have a range from 3000 to 20000 g/m$^2$/24 hr. To maintain acceptable MVTR, in some embodiments, the elastic fibers 20 cover less than or equal to 40% of the surface area of the functional layer 40, e.g., less than or equal to 20%. Lower surface coverage can avoid a significant decrease in MVTR.

The functional layer 40 is typically a very thin layer. In one embodiment, the thickness of the functional layer 40 is from 0.01 to 0.5 mm, e.g., from 0.01 to 0.3 mm. In some embodiments, the functional layer has a thickness that is less than 0.06 mm, less than 0.05 mm, less than 0.04 mm, or less than 0.03 mm.

Additional treatments may be provided that impart functionality, such as but not limited to, oleophobicity and hydrophobicity. In some embodiments, the membrane can be treated with an oleophobic and/or hydrophobic coating. Examples of oleophobic coatings include for example, polyurethanes, fluoropolymers such as fluoroacrylates and other materials such as those taught in U.S. Pat. No. 6,261,678, and U.S. Pub. No. 2007/0272606, the entire contents and disclosures of which are incorporated by reference. Oleophobicity can also be provided by coating at least one surface of the membrane with a continuous coating of an oleophobic, moisture vapor transmissive polymer.

Turning to the elastic fibers 20, which are added as a separate layer to the laminate 1 in a substantially parallel arrangement, the elastic fibers 20 have a recovery of at least 80% when under a strain of at least 20%, e.g. a strain of at least 50%, or a strain of at least 100% strain. In some embodiments, the recovery of the elastic fibers may be higher than 80%, and may be at least 90% or at least 95% under strains of at least 20% or at least 50% or at least 100%. In certain embodiments, the elastic fibers 20 comprise at least one of an elastomer, such as natural rubber, polybutadiene, an elastomeric polyolefin, a polyurethane, a polyester, a silicone, a fluoroelastomer, an elastane, a block co-polymer containing polyesters, a polyester-polyurethane, a polyamide, or a combination thereof. In some embodiments, the elastic fibers 20 are elastane fibers, spandex, LYCRA® polyester-polyurethane fibers or a combination thereof. In some embodiments, the plurality of elastic fiber can be or can contain at least a portion of elastomers that are flame or fire retardant, for example, silicone elastomers or other fibers that have been treated with a known fire retardant additive or coating. In some embodiments, the plurality of elastic fibers 20 comprise a material that is different than the material of the textile layer 10. The denier of the elastic fibers 20 may be less than or equal to 400, 300, 200, 120, 100, or any value therein. In one exemplary embodiment, the denier of the elastic fibers 20 is 300. In certain embodiments, the denier and/or weight of the elastic fibers 20 is matched to the material weight of the textile layer, with heavier weight fabrics requiring a larger denier elastic fiber. The size of the elastic fiber may also depend on the in-plane textile compressibility, where the highly compression resistant textile generally use larger denier elastic fibers. In some embodiments, the elastic fibers have a weight from 30 to 400 denier, or any value therein, e.g., 40 to 300 denier, 50 to 200 denier, or 60 to 150 denier. The elastic fibers may be monofilament elastic fibers or multifilament elastic fibers.

Figure 3:
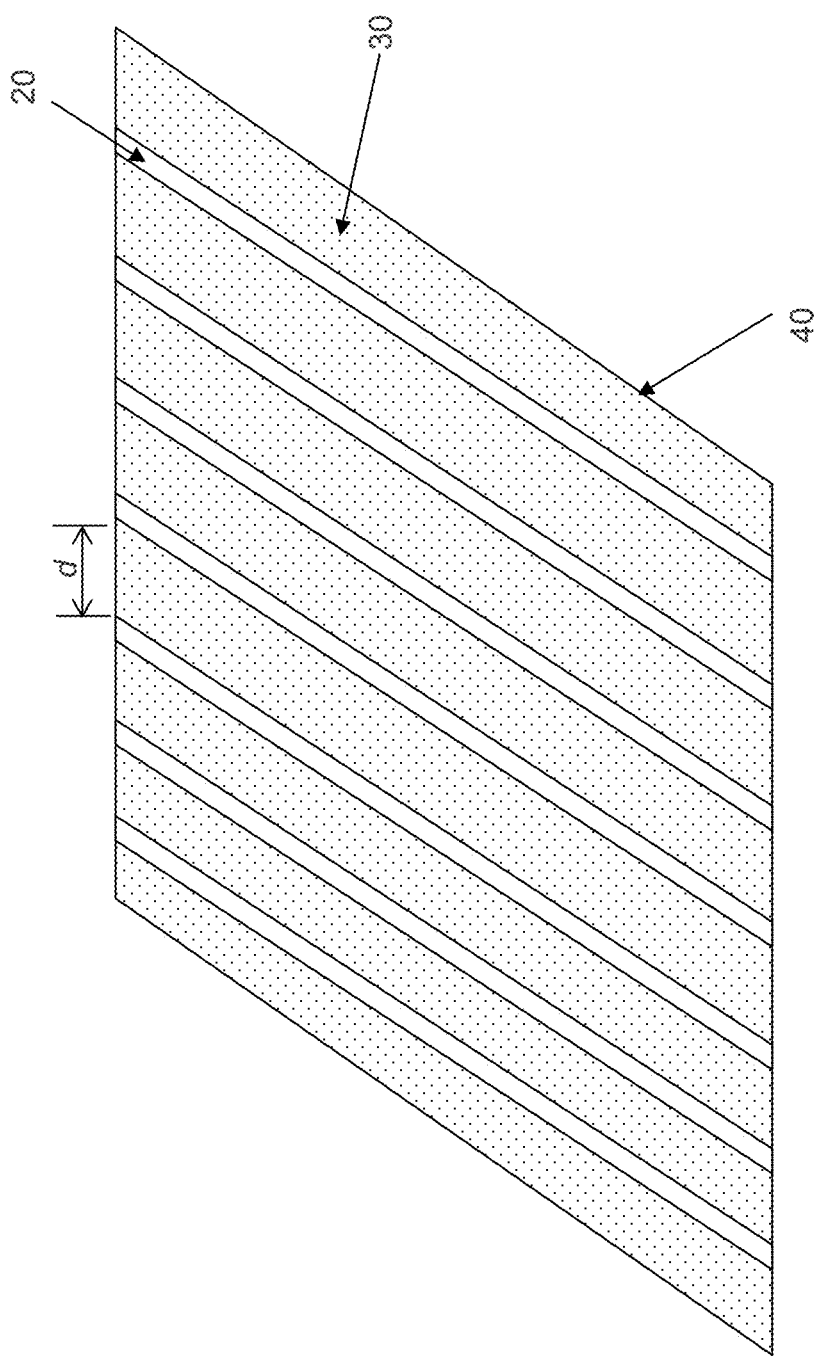
FIG. 3 is a perspective view of uniformly spaced fibers on a functional layer according to embodiments of the present invention.

Uniform elastic fiber spacing may advantageously achieve a flat appearance on the surface of the laminate that is opposite the functional layer, which is typically the textile layer. FIG. 3 is a perspective view of FIG. 2 without the textile layer to show the uniform elastic fiber 20 spacing d in the longitudinal direction. The elastic fibers generally run in one direction, such as the longitudinal direction of the fabric, and are substantially parallel to each other, though the fibers may occasionally contact or cross each other.

The internal distance d is the space between adjacent elastic fibers 20 and is also referred to herein as the adjacent spacing. Not intending to be bound by theory, when the internal distance between any two adjacent elastic fibers 20 exceeds a maximum distance determined primarily by the laminate thickness, the outmost surface 12 of the laminate 1 tends to buckle, ripple, bunch, and/or pucker. To avoid the undesired buckling, rippling, bunching, and/or puckering, a majority of the elastic fibers 20 have an adjacent spacing that is less than or equal to the maximum fiber spacing (MFS). MFS in millimeters (mm) may be approximated by the following formula:

$$MFS=3(t)$$

where t is the thickness of the laminate in mm, measured in a stretched state by tensioning the laminate to its fullest non-plastic extension using the procedure found in the examples section. In other embodiments, MFS in millimeters can be equal to 2.9(t) or 2.8(t) or 2.7(t) or 2.6(t) or 2.5(t) or 2.4(t) or 2.3(t) or 2.2(t) or 2.1(t) or 2.0(t), wherein t is the thickness of the laminate as measured in the stretched state. In some embodiments, at least 80% of the elastic fibers have an adjacent spacing that is less than or equal to the MFS which is based on the thickness of the laminate as disclosed above. In other embodiments, at least 85%, at least 90%, or 91% or 92% or 93% or 94% or 95% or 96% or 97% or 98% or 99% or 100% of the elastic fibers have an adjacent spacing that is less than or equal to the MFS based on the thickness of the laminate. In still further embodiments, the maximum distance between adjacent fibers does not exceed the maximum fiber spacing of the stretchable laminate. When 20% or more of the elastic fibers have an adjacent spacing that is greater than the MFS, non-uniformities may occur which lead to undesired buckling. This also causes the normalized Ra to have peaks above 25 micrometers.

The internal distance d between elastic fibers 20 depends on the MFS and can vary with textile materials and thickness. In some embodiments, the plurality of elastic fibers are spaced apart at an internal distance from 0.1 to 1.5 millimeters (mm). In exemplary embodiments, the elastic fibers are uniformly spaced apart within a MFS that is less than or equal to 1.5 mm, e.g., less than or equal to 1.1 mm, less than or equal to 1 mm, less than or equal to 0.9 mm, less than or equal to 0.5 mm, or less than or equal to 0.4 mm. In terms of ranges, in certain embodiments, the MFS may be from 0.1 to 1.5 mm, e.g., from 0.25 to 1.1 mm, 0.25 to 1 mm, 0.4 to 1 mm, 0.5 to 1 mm, or from 0.5 to 0.9 mm. This spacing of the elastic fibers allows for 5 to 40 elastic fibers per linear centimeter of laminate in the transverse direction, i.e. direction perpendicular to the fibers. In some embodiments, the number of elastic fibers per linear centimeter may be from 10 to 30 or from 15 to 20.

The stretchable laminates further comprise an adhesive layer 30. As used herein, the phrase "adhesive layer" means a bonding layer or region. In some embodiments an adhesive composition is used to bond the layers and/or the elastic fibers. In other embodiments, the layers and/or the elastic fibers can be joined using other known bonding technique, such as welding, etc. An adhesive layer is disposed between the plurality of elastic fibers and the textile layer and/or the functional layer, and the adhesive layer is typically used to join the textile or functional layer to the next layer and/or one textile or functional layer to the plurality of elastic fibers. For example, if a stretchable laminate comprising the textile layer/elastic fiber/functional layer composite structure of FIG. 2 is desired, one adhesive layer can be used to bond the textile layer to a plurality of elastic fibers and also to the functional layer, thus producing the desired stretchable laminate. As shown in FIG. 2 adhesive layer 30 is disposed between the functional layer 40 and the plurality of elastic fibers 20. In some embodiments, the plurality of elastic fibers 20 are adhered to the functional layer 40 on the side opposite to the textile layer 10. In other embodiments, adhesive layer 30 is positioned so that the plurality of elastic fibers 20 are first adhered to the textile layer 10 before being adhered to the functional layer 40. Depending on the arrangement of the layers there may be multiple adhesive layers.

Any suitable adhesive composition may be used with the embodiments described herein. In some embodiments, the adhesive layer comprises an adhesive composition of polyurethane and styrene-based block copolymers such as styrene/isoprene and styrene/butadiene block copolymers, or combinations thereof. In other embodiments, the adhesive composition can comprise a flame or fire resistant additive as is known in the art. In other embodiments, the adhesive composition can comprise an intumescent carbon/polymer mixture, for example, as described in US 2013/0156680, which is incorporated by reference in its entirety.

The adhesive composition may be applied by any method known in the art, uch as printing, spraying, stamping, or rolling; and in any pattern, such as lines, dots, or continuous area. In some embodiments, the plurality of elastic fibers 20 are adhered by a discontinuous layer of adhesive 30 as shown in FIG. 3. Adhesive dots having a diameter from 100 to 1000 microns may be used. In embodiments where the adhesive layer is discontinuous, the spacing between adjacent adhesive areas when measured from edge to edge is generally equal to or less than the MFS. "Edge to edge" when used in this context means the measurement of the distance between two adjacent adhesive areas (i.e., the space that contains no adhesive material). In some embodiments, the edge to edge distance is 100% or less than the MFS. In other embodiments, the edge to edge distance is less than 80% or less than 70% or less than 60% or less than 50% or less than 40% or less than 30% or less than 20% or less than 10% of the MFS. It has been found that as the edge to edge spacing between adjacent adhesive areas approaches the MFS, then the surface of the laminate in a non-stretched state becomes less flat. In other embodiments, the plurality of elastic fibers are adhered by a continuous layer of adhesive as shown in FIG. 2.

The total weight of the adhesive composition is less than or equal to 35% of the total weight of the laminate, e.g., less than or equal to 30%, less than or equal to 25%, less than or equal to 15%, less than or equal to 10%, or less than or equal to 5%. In some embodiments, the functional layer and the adhesive layer may be pre-associated in a functional/adhesive layer. In one embodiment, the functional/adhesive layer is a polyurethane-coated ePTFE. In other embodiments, the elastic fibers 20 and the adhesive layer 30 may be pre-associated by coating or printing the adhesive layer onto the elastic fibers.

In other embodiments, no adhesive layer is used and the layers may be welded or otherwise bonded together by compression.

Optionally, the stretchable laminate may comprise a backing layer, for example, a second textile layer or a second functional layer. In some embodiments, the backing layer may comprise a woven, nonwoven or knitted material. In other embodiments, the backing layer comprises at least one of a woven, nonwoven or knitted nylon, polyester, cotton, silk, or a combination thereof. In other embodiments, the backing layer may comprise one or more additional microporous layers. In some embodiments, the stretchable laminate further comprises a second textile layer comprising a non-elastic material having a first surface and a second surface, wherein the first surface of the second textile is disposed on a first or a second functional layer, if two functional layers are utilized. If a backing layer or a second textile layer is used, one or both of the outwardly facing surfaces of the first and second textiles, that is, the surfaces that are opposite the functional layer, in a non-stretched state can have an average normalized surface roughness (Ra) of less than or equal to 25 micrometers.

Once assembled, the stretchable laminate 1 of FIG. 2 has a flat appearance that can achieve a desired aesthetic appearance. The flat appearance may be assessed by measuring the stretchable laminate in the non-stretched state by profilometry as described herein. Also a majority of the elastic fibers 20 of the stretchable laminate 1 of FIG. 2 are spaced by an internal distance d that is less than or equal to the MFS. Advantageously, by incorporating the elastic fibers into the stretchable laminate the embodiments of the present invention can achieve a flat appearance and provide a stretchable laminate. The stretchable laminate may have elasticity that is greater than the elasticity of the textile material prior to incorporation into the stretchable laminate. In one embodiment the stretchable laminate has a recovery of at least 80% after an elongation of at least 10%. In other embodiments, the stretchable laminate has a recovery of at least 80% after an elongation of least 20%, or an elongation of at least 25%, or an elongation of at least 50%. The textile materials and the functional layers used to produce the stretchable laminate can have an elongation of less than or equal to 15% or less than or equal to 10% or less than or equal to 5% as measured by ASTM D 5035-06. The disclosed stretchable laminates can have an elongation of up to 150%, for example, greater than 5% or greater than 10% or greater than 15% or in the range of from 5% to 150% as measured by ASTM D 5035-06. In each case, the percentage elongation in the laminate is greater than the elongation of any of the individual layers alone. In other embodiments, the stretchable laminates can have an elongation of 5%, 10%, 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125% or any value between any of those stated elongation values. Depending upon the choice of the functional layer, the stretchable laminate can also be waterproof and breathable in both the non-stretched and stretched states.

In addition to the arrangement shown in FIG. 2, the embodiments may also have different arrangements of the layers with the elastic fibers.

Figure 4:
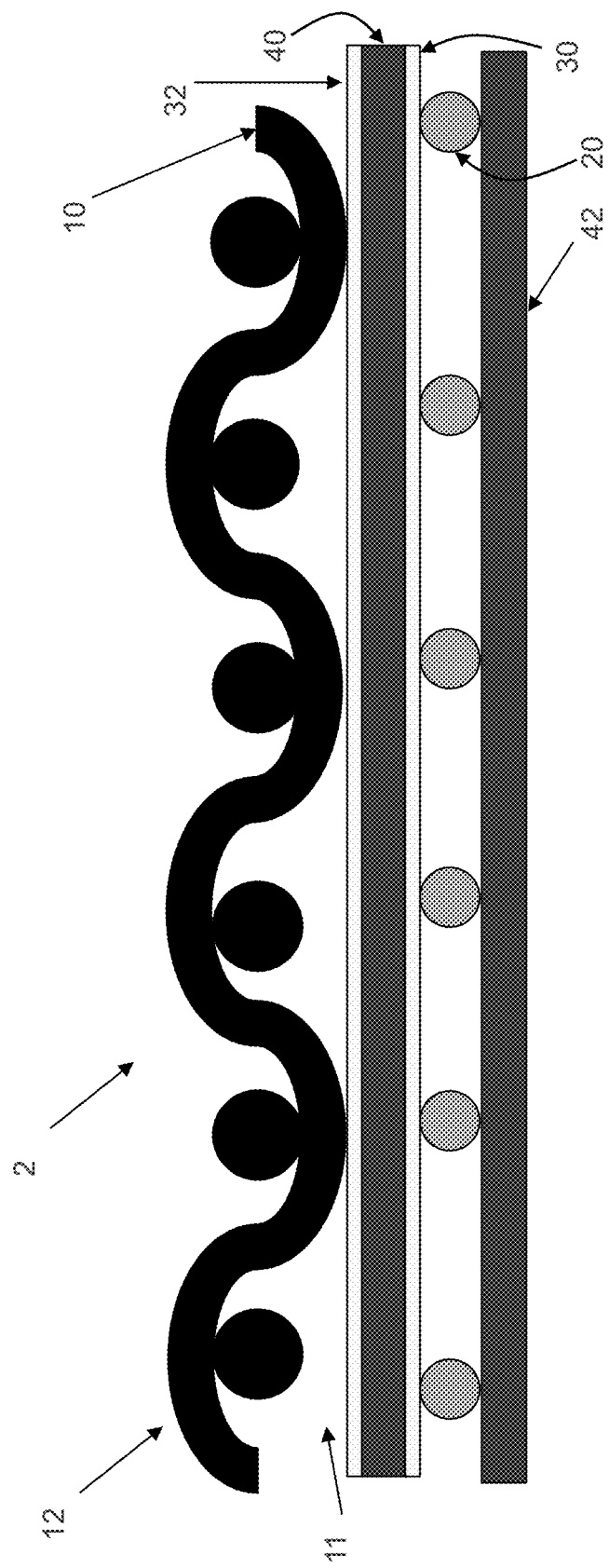
FIG. 4 is a schematic representation of a cross-section of a stretchable laminate having a flat surface in a non-stretched state according to embodiments of the present invention.

FIG. 4 shows a laminate 2 having two functional layers 40, 42 and the plurality of elastic fibers 20 are disposed between the functional layers 40, 42. A first adhesive layer 30 may bond the elastic fibers 20 to one of the functional layers and may also bond the functional layers 40, 42 together. A second adhesive layer 32 bonds one of the functional layers 40 and the textile layer 10.

Figure 5:
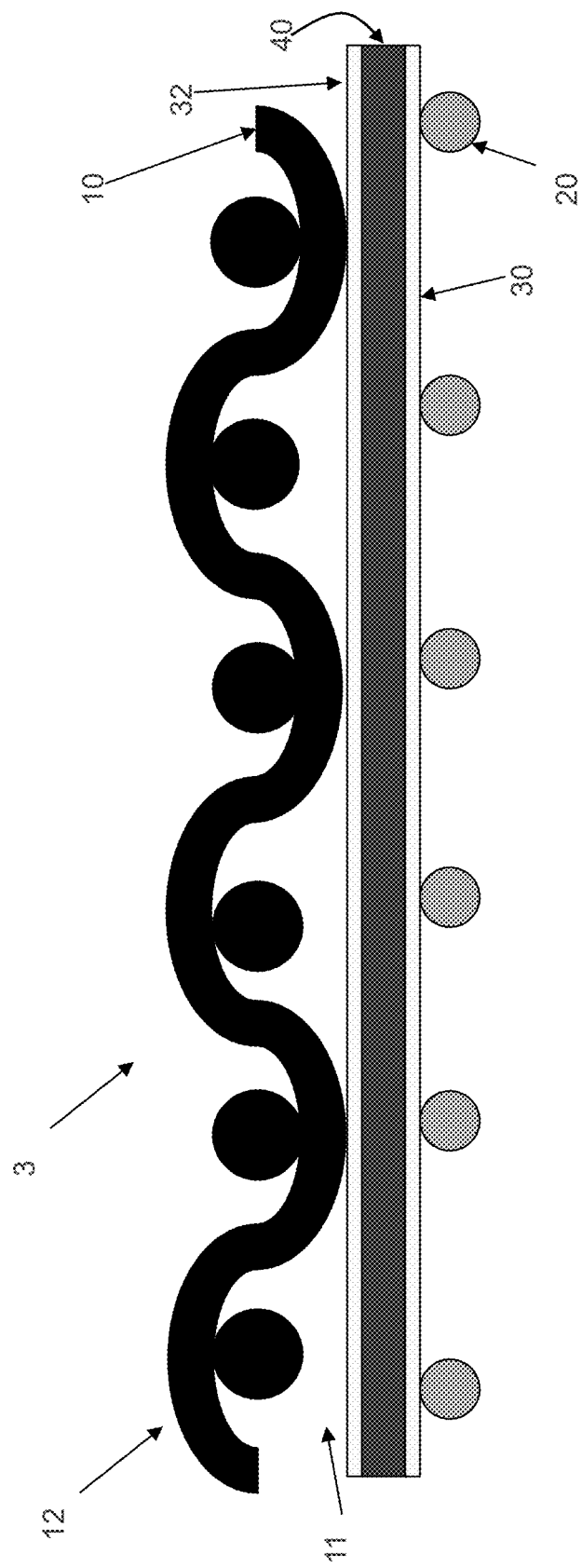
FIG. 5 is a schematic representation of a cross-section of a stretchable laminate having a flat surface in a non-stretched state according to embodiments of the present invention.

FIG. 5 shows a stretchable laminate 3 having a plurality of elastic fibers 20 disposed on a side of the functional layer 40 opposite of the textile layer 10. A second adhesive layer 32 bonds the functional layer 40 and the textile layer 10. Although not shown a backing layer may also be provided. Because the elastic fibers 20 are adhered to the side opposite of the textile layer 10, this allows the stretch film comprised of the functional layer 40 and elastic fibers 20 to be used with a wide variety of textile layers 10.

Figure 6:
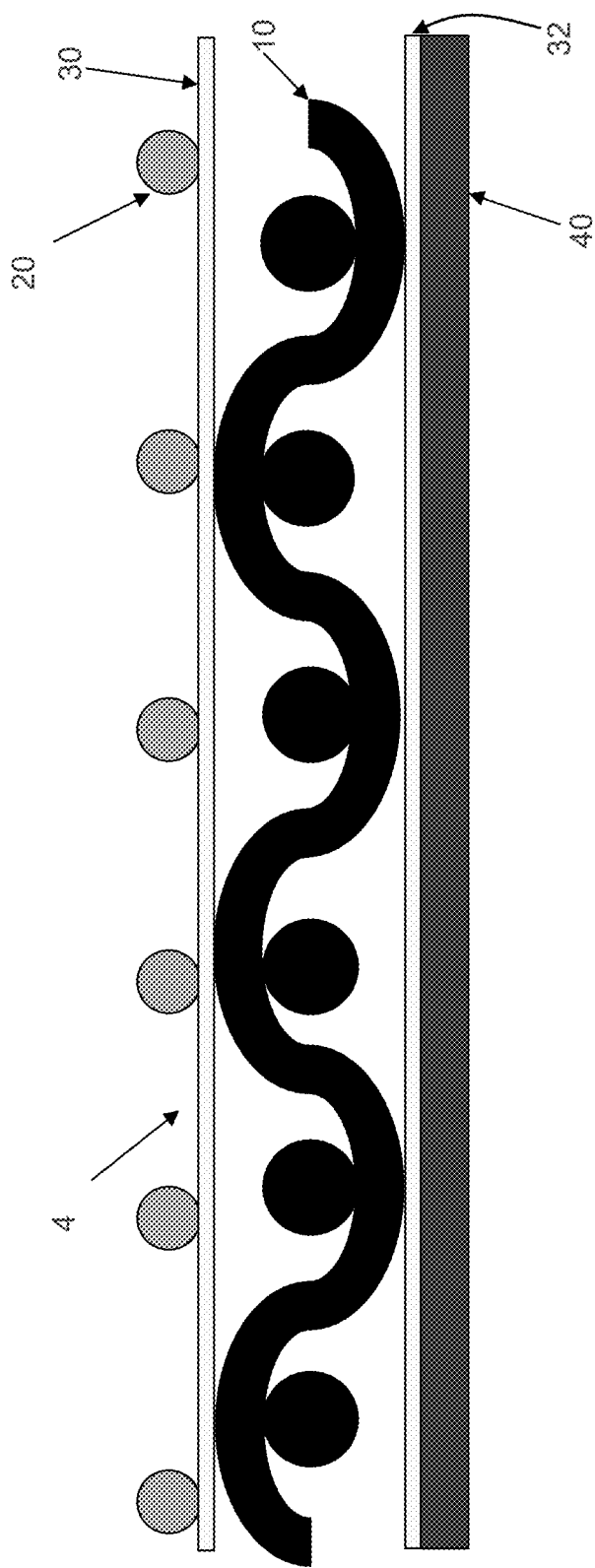
FIG. 6 is a schematic representation of a cross-section of a stretchable laminate having a flat surface in a non-stretched state according to embodiments of the present invention.

FIG. 6 shows a stretchable laminate 4 having a plurality of elastic fibers 20 disposed on a side of the textile layer 10 opposite of the functional layer 40. A second adhesive layer 32 bonds the functional layer 40 and the textile layer 10.

Figure 7:
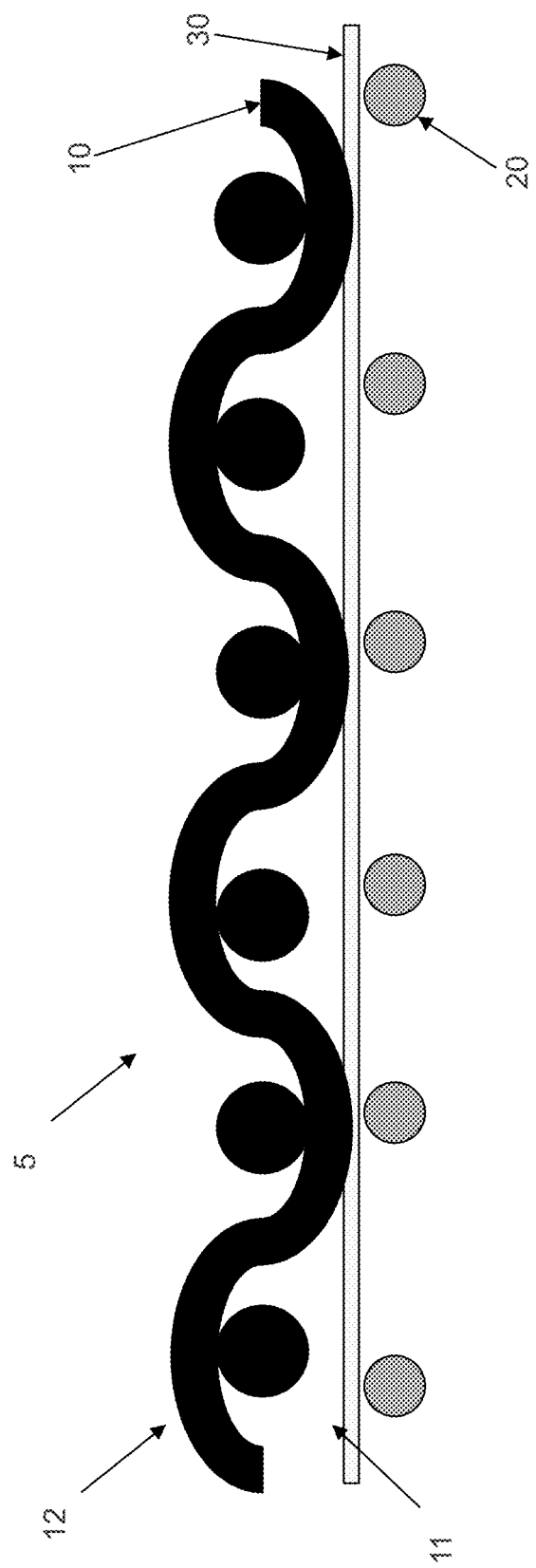
FIG. 7 is a schematic representation of a cross-section of a stretchable laminate having a flat surface in a non-stretched state according to embodiments of the present invention.

FIG. 7 shows a stretchable laminate 5 having a plurality of elastic fibers 20 disposed on a textile layer 10. No functional layer is incorporated into the laminate 5. The textile layer 10 may be of a material that is both non-elastic and provides waterproofness and/or breathability.

The disclosure also relates to a stretchable laminate comprising a plurality of elastic fibers disposed in a substantially parallel arrangement between a first textile layer and a second textile layer. The first and the second textile layers as well as the plurality of the elastic fibers can be any of those that have been previously described. One or both of the first and second textile layers may be of a material that is both non-elastic and provides waterproofness and/or breathability.

Figure 8:
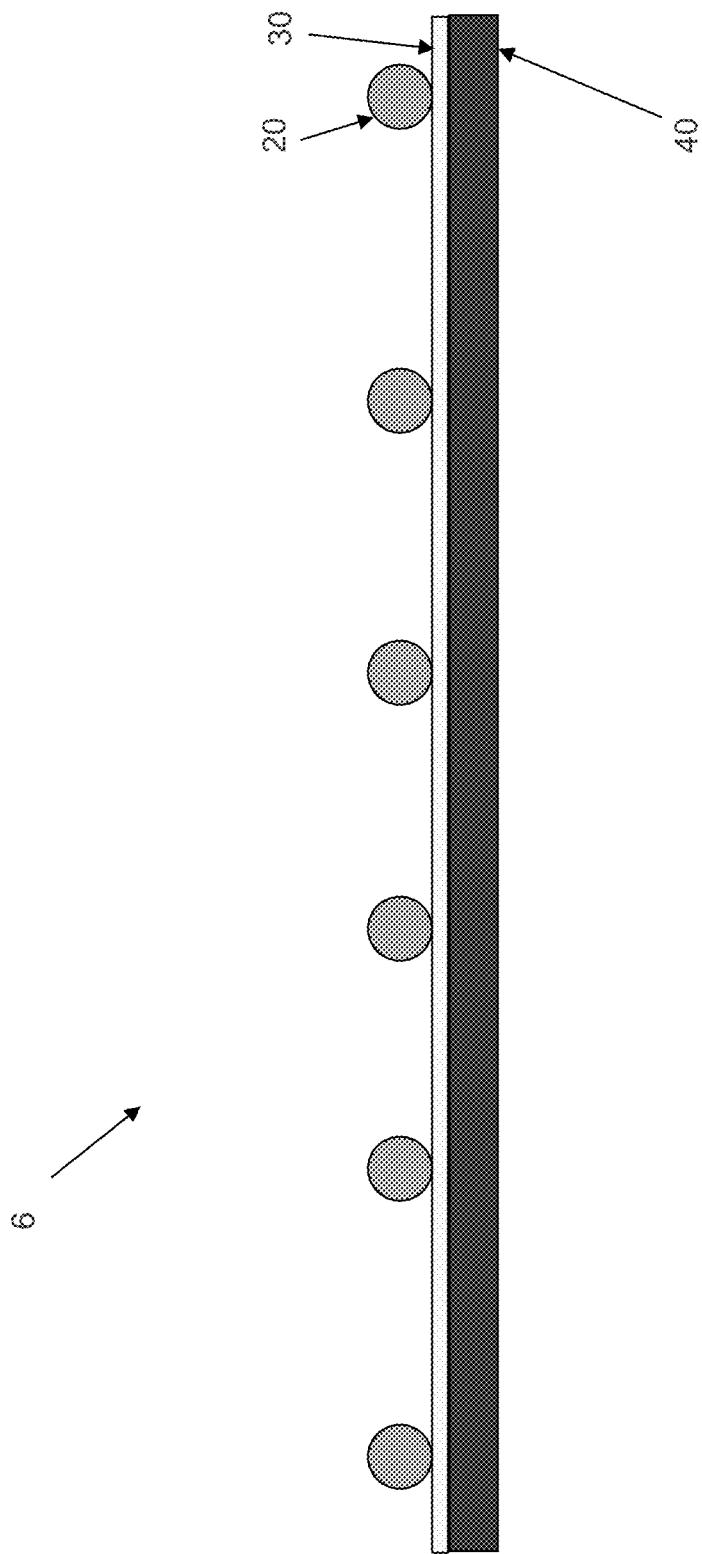
FIG. 8 is a schematic representation of a cross-section of a stretchable laminate having a flat surface in a non-stretched state according to embodiments of the present invention.

The disclosure also relates to a stretchable laminate comprising a plurality of elastic fibers disposed in a substantially parallel arrangement on a first functional layer; optionally further comprising a second functional layer wherein the second functional layer, if present, is disposed on the first functional layer with the plurality of elastic fibers disposed between the first and second functional layer or wherein the second functional layer is disposed on the first functional layer on the side opposite the plurality of elastic fibers, and wherein the plurality of elastic fibers have a fiber density of at least 7.9 fibers per centimeter. FIG. 8 shows a stretchable laminate 6 having a plurality of elastic fibers 20 disposed on a functional layer 40. In embodiments with no textile layer, the elastic fibers can have a fiber density of at least 7.9 fibers per centimeter (20 fibers per inch) and up to about 40 fibers per centimeter (about 100 fibers per inch). In other embodiments, the fiber density can be in the range of from 12 fibers per centimeter to 32 fibers per centimeter, or from 15 fibers per centimeter to 30 fibers per centimeter.

Figure 9:
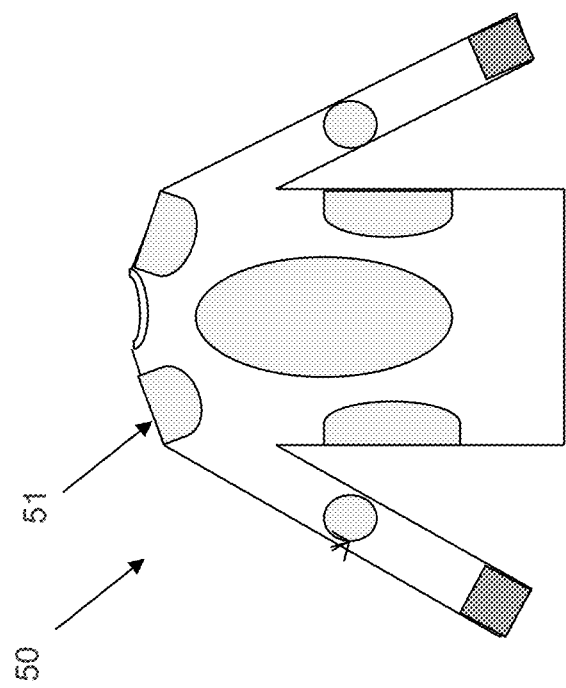
FIG. 9 is a schematic representation of a stretchable laminates incorporated into a garment.

In one embodiment, the stretchable laminates described herein may be used to fabricate whole garments. Garment may include any of outerwear, underwear, footwear, glove, headwear, and accessories. As shown in FIG. 9 the laminates described herein may also be used to fabricate a portion or portions 51 of whole garments 50, such as an elbow panel, a shoulder region, cuff region, or a side panel, etc. This may provide elasticity in regions of the garment that provide a benefit to the wearer or make the garment more form-fitting. In some embodiments, the stretchable laminates described herein may be used to fabricate a portion or portions of a shoe construction or a shoe insert, such as a toe portion, a shank portion, or a tongue portion. The garments as disclosed herein may be produced so that the functional layer faces away from a wearer, for example, the functional layer can be the outermost surface of the garment. In other embodiments, the garment may be produced so that the textile layer faces away from a wearer, for example, the textile layer can be the outermost surface of the garment.

Also disclosed are methods of manufacturing stretchable laminates having a flat appearance from a plurality of elastic fibers, and one or more textile layers, one or more functional layers, or a combination thereof. The elastic fibers are incorporated under tension into the stretchable laminate as a separate layer to be positioned in a substantially parallel arrangement.

The process will now be described for producing a stretchable laminate comprising a textile layer and a functional layer. It should be understood that any of the other embodiments described above can be produced according to this method. While retaining the tension on the elastic fibers, the adhesive, the textile and the functional layers are fed through a lamination nip, and the resulting laminate is spooled onto a roll and allowed to cure. Following curing, the laminate is unspooled and allowed to relax, thereby returning to an unstretched state. Stretchable laminates comprising three or more layers, for example, two textile layers and one functional layer, one textile layer and two functional layers can also be produced using this method.

An advantage of the method is that the elastic fibers do not have to be woven into the textile; rather, they are introduced as a separate layer. Therefore, off-the-shelf non-elastic textiles may be used in the stretchable laminate. Another advantage is that prototyping is faster, with quicker turn-out due to not having to weave or knit a textile with elastic fibers incorporated into the textile.

The details of one or more embodiments are set forth in the description herein. Other features, objects, and advantages will be apparent from the description and from the claims. The examples below are intended to further illustrate certain aspects of the methods and compositions described herein, and are not intended to limit the scope of the claims.

Test Methods

It should be understood that although certain methods and equipment are described below, any method or equipment determined suitable by one of ordinary skill in the art may be alternatively used.

Elongation and Recovery Test Protocol

ASTM test method D 5035-06 "Standard Test Method for Breaking Force and Elongation of Textile Fabrics (Strip Method)" was used to measure elongation and recovery of the stretch laminate test specimens. Test specimens 1" wide×6" long were cut along the warp direction. Elongation was measured using an Instron® machine using a gauge length of 4". Measurements were recorded at 4 lbf, at which point the load was removed. Total Elongation was defined as total increase in gauge length upon application of a force. % elongation was defined as percent (%) increase in gauge length upon application of a force. Calculation of % recovery was performed after removing the load, using equation given below:

$$\% \text{ Recovery}=100-100*(\text{Final Length}-\text{Initial Length})/\text{Total Elongation}$$

Moisture Vapor Transmission Rate Test Protocol (MVTR)

MVTR is measured according to DIN EN ISO 15496 (2004). As this is a standard test used in the textile industry, reference is made to the detailed description of the MVTR test disclosed in DIN EN ISO 15496 (2004). For a description of the MVTR test, see also WO 90/04175 A1.

The basic principles are summarized as follows. The sample to be tested together with a highly water vapor permeable, but waterproof microporous membrane is inserted in an annular sample support. Then, the support is immersed in water for 15 minutes (deionized water at 23° C.) such that the membrane contacts the water. A cup is filled with a saturated solution of potassium acetate in water such as to produce a relative humidity of 23% at the surface of the sample and is covered with a second piece of the same waterproof microporous membrane. The cup including the potassium acetate solution and the second membrane is weighed and then placed on top of the sample support such that the second membrane contacts the sample. This leads to a transfer of water vapor through the sample from the side of the water into the cup with the potassium acetate. After 15 minutes, the cup with the potassium acetate is removed and its weight is determined. The same procedure is carried out with the first and second membranes, but without the sample, in order to determine moisture vapor permeability of the test setup without the sample. Then, the MVTR of the sample can be determined from the difference of both measurements, also considering the influence of the two additional microporous membranes.

The moisture vapor transmission rate (MVTR) of the laminate according to the invention was measured in accordance with EN ISO 15496 (2004) and is expressed in $g/m^2/24$ hr. In order to be considered as water vapor permeable as used herein, the laminate should generally have a water vapor permeability of at least 3000 $g/m^2/24$ hr, preferably at least 8000 $g/m^2/24$ hr and more preferably at least 12000 $g/m^2/24$ hr. MVTR values may be as high as 20000 $g/m^2/24$ hr.

Suter Test for Liquid-Proof Fabrics

The Suter Test Method was used to determine if a sample was liquid-proof. This procedure is based generally on the description in ASTM D 751-00, Standard Test Methods for Coated Fabrics (Hydrostatic Resistance Procedure B2). This procedure provides a low pressure challenge to the sample being tested by forcing water against one side of the test sample and observing the other side for indication that water has penetrated through the sample.

The test sample was clamped and sealed between rubber gaskets in a fixture that held the sample so that water could be applied to a specific area. The circular area to which water was applied was 4.25 inches in diameter. The water was applied at a pressure of 1 psig (0.07 bar) to one side of the sample. In testing laminates with one textile layer the pressurized water was incident upon the film side.

The unpressurized side of the sample was observed visually for any sign of water appearing for 3 minutes. If no water was observed the sample was deemed to have passed the test and was considered liquid-proof. The reported values were the average of three measurements.

Normalized Surface Roughness (Ra) Test Protocol

The face surface profile was measured using a non-contact surface profilometer. 50 mm×50 mm square samples of the material to be tested were cut, with one of the edges oriented parallel to the mean elastic fiber axis direction. The non-face side of the untensioned sample was attached to a flat 50 mm×50 mm sample mount using a non-foam-based, double-sided tape (3M ID 7000122521) and a uniform pressure of 1.72 Newtons/centimeter (N/cm). The sample mount was placed in the detection area, with the edges parallel to the x and y directions of travel of the profilometer stage, and the surface profile of the sample was measured within a 30 mm×30 mm area at an x-y resolution of 50 μm or smaller. The accuracy of the measurement was confirmed by measuring an appropriate calibration standard using the same profilometer settings.

Figure 10B:
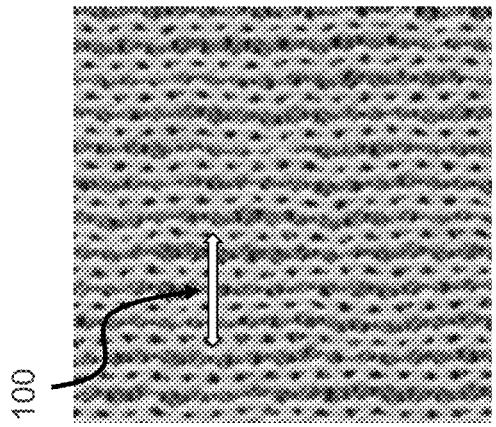
FIG. 10B is a photograph of a knit fabric with an arrow indicating feature spacing.
Figure 10A:
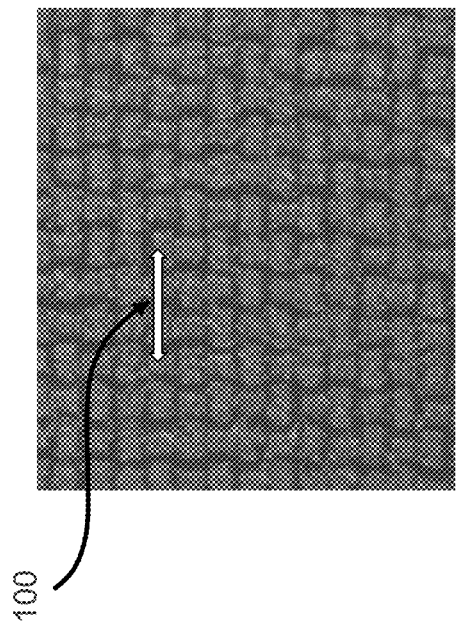
FIG. 10A is a photograph of a woven fabric with an arrow indicating feature spacing.

A face layer feature spacing for the laminate was determined by the textile outermost layer. For wovens, the feature spacing is the average spacing (center to center, in mm) of adjacent yarns, as shown by the white arrow 100 in FIG. 10A. For knits, the feature spacing is the average spacing (center to center, in mm) of adjacent loops, as shown by the white arrow 100 in FIG. 10B.

A normalization procedure was applied to the surface profile to adjust for surface roughness attributable to the textile layer's inherent roughness. This normalization procedure included only relevant textile surface data. Non-surface features (such as holes in the textile layer) were omitted from the data. A 2-dimensional moving average of the surface height data was calculated, using a window size of 2× the face layer feature spacing. The normalized surface roughness (Ra) was calculated in the direction of the mean elastic fiber axis for each pixel row in the normalized surface profile. Examples of the normalized surface roughness can be seen in FIGS. 11B, 12B, 13B, 14B, 15B and 16B. The average normalized surface roughness and the maximum normalized surface roughness were then calculated from the normalized surface roughness data.

Laminate Thickness Test Protocol

The laminate thickness was measured by tensioning the laminate to its fullest extent in the direction of the mean elastic fiber axis, yet where the laminate still exhibited ≥90% recovery and ≤5% reduction in width; placing the sample between two rigid surfaces with an area of 5 cm$^2$; and measuring the separation of the surfaces using a digital micrometer (Model XLI 40002, Mahr Federal Inc., Providence, RI) at a pressure of 0.11 N/cm$^2$.

EXAMPLE 1

Inventive Stretchable Laminate

A length of 67 g/m$^2$ nylon woven material (Style 130970 (MI187R) from Milliken & Company, Spartanburg, SC), a quantity of elastane fibers (120 denier, Type 902C from Invista, Wichita, KS), and a length of polyurethane-coated ePTFE membrane were obtained. The ePTFE membrane had the following properties: thickness=0.043 mm, density=0.41 grams per cubic centimeter (g/cc), matrix tensile strength in the length direction=31×10$^6$ MegaPascal (MPa), matrix tensile strength in the width direction=93×10$^6$ MPa, Bubble Point=1.5×10$^5$ MPa. Polyurethane (PU) was applied by coating the ePTFE membrane and allowing it to at least partially penetrate the pores of the membrane, then cured.

The elastane fibers were loaded onto a beam and fed through two reeds, each at a spacing of 20 dents per centimeter (cm). Another polyurethane was obtained and loaded in the printer to add adhesive dots to the ePTFE side of the polyurethane-coated ePTFE membrane. Dots of 335 micron diameter were applied at a percent area coverage of 54% to the ePTFE membrane. The woven material was placed onto the adhesive side of the membrane, while the elastane fibers were tensioned to 250 % elongation and inserted between the ePTFE membrane and woven material. The first reed was mounted approximately 7 cm from the lamination nip, adjacent to the woven material. The second reed was mounted approximately 15 cm from the lamination nip and shifted laterally with respect to the first reed by 5 cm. While retaining the tension on the elastane fibers, the resulting laminate was spooled onto a roll and allowed to cure, which required approximately 2 days. Following curing, the laminate was unspooled and allowed to relax, thereby returning to an unstretched state.

Figure 11B:
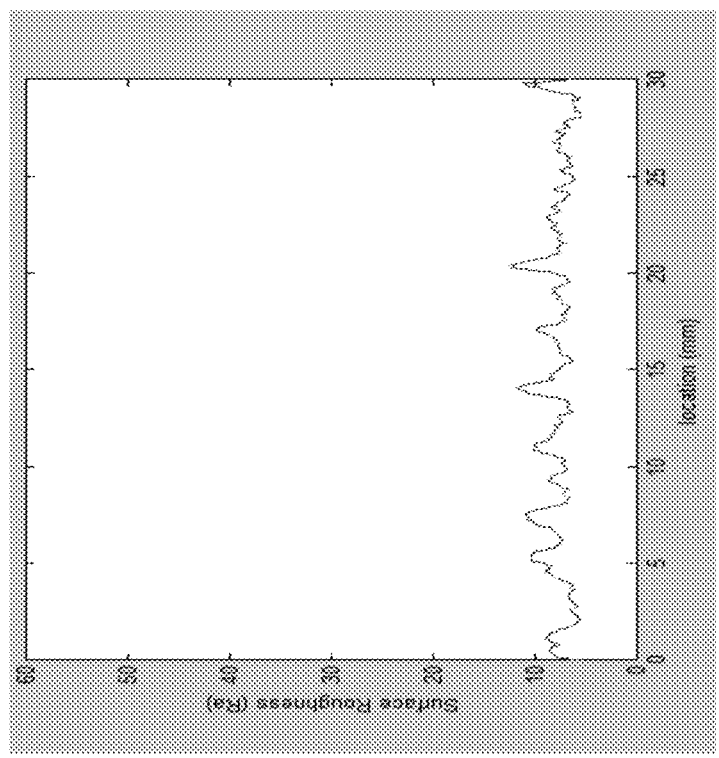
FIG. 11B is a graph of normalized surface roughness (Ra) measurements across the surface of a stretchable laminate of the present invention.
Figure 11A:
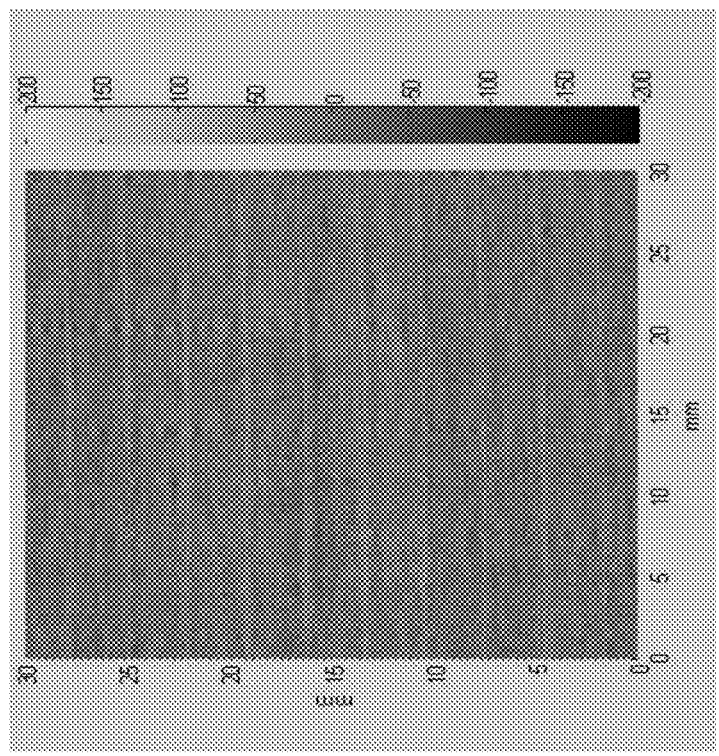
FIG. 11A is a 3-dimensional surface plot of a stretchable laminate of the present invention.

The surface topography of the outermost surface of the laminate is shown in FIG. 11A. Normalized Ra was determined, and is shown in FIG. 11B. The thickness of the stretched laminate was 0.252 mm, the average MVTR was 133305.9 g/m$^2$/24 hr, the Suter test result was pass/pass/pass, the percent elongation was 60.6%, and percent recovery was 96.9%, as shown in FIG. 17.

EXAMPLE 2

Comparative Functional Laminate

A length of 67 g/m$^2$ nylon woven material (Style 130970 (MI187R) from Milliken & Company, Spartanburg, SC), a quantity of elastane fibers (120 denier, Type 902C from Invista, Wichita, KS), and a length of polyurethane-coated ePTFE membrane were obtained. The ePTFE membrane had the following properties: thickness=0.043 mm, density=0.41 grams per cubic centimeter (g/cc), matrix tensile strength in the length direction=31×10$^6$ MegaPascal (MPa), matrix tensile strength in the width direction=93×10$^6$ MPa, Bubble Point=1.5×10$^5$ MPa. Polyurethane (PU) was applied by coating the ePTFE membrane and allowing it to at least partially penetrate the pores of the membrane, then cured.

The elastane fibers were loaded onto a beam and fed through one reed having a spacing of 20 dents per centimeter (cm). Another polyurethane was loaded in the printer to add adhesive dots to the ePTFE side of the polyurethane-coated ePTFE membrane. Dots of 335 micron diameter were applied at a percent area coverage of 54% to the ePTFE membrane. The woven material was placed onto the adhesive side of the membrane, while the elastane fibers were tensioned to 250% elongation and inserted between the ePTFE membrane and woven material. The reed was mounted approximately 15 cm from the lamination nip, adjacent to woven material. While retaining the tension on the elastane fibers, the resulting laminate was spooled onto a roll and allowed to cure, which required approximately 2 days. Following curing, the laminate was unspooled and allowed to relax, thereby returning to an unstretched state.

Figure 12B:
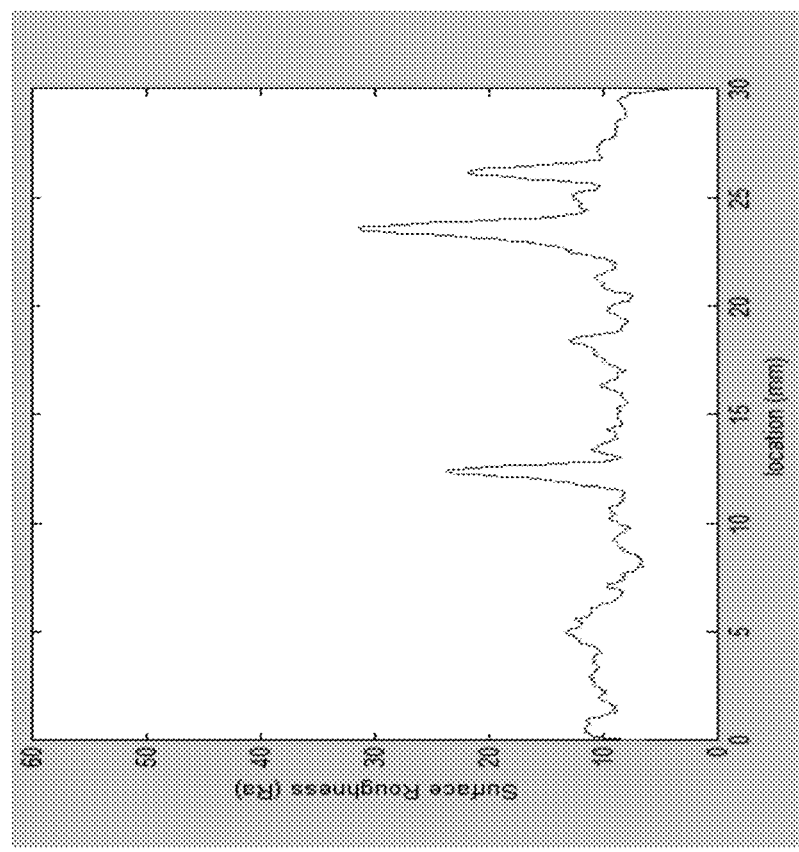
FIG. 12B is a graph of normalized Ra measurements across the surface of a stretchable laminate with a buckled surface.
Figure 12A:
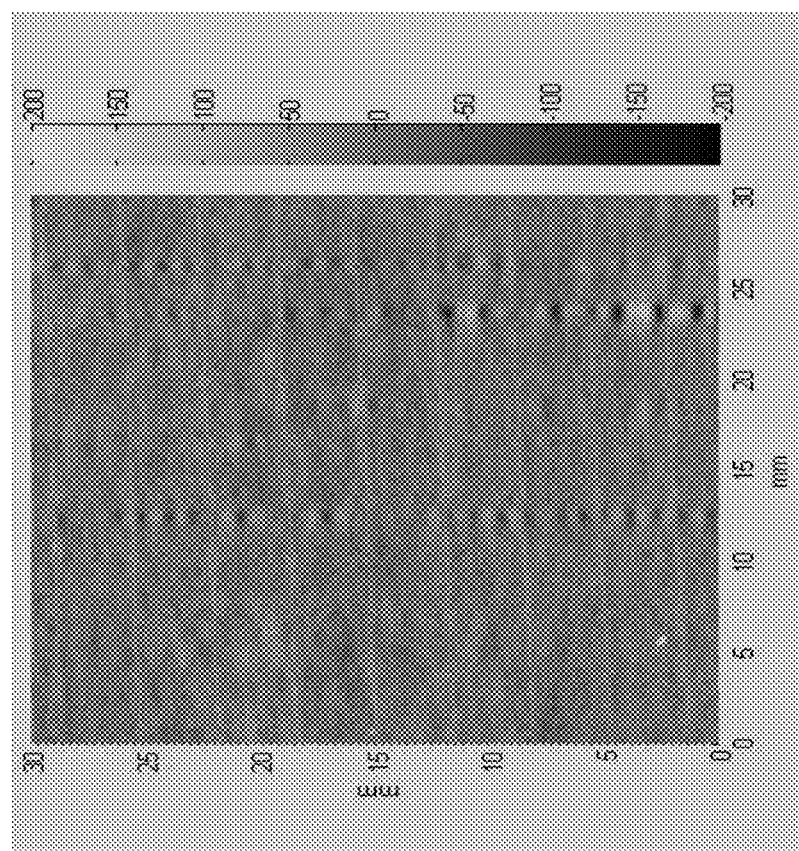
FIG. 12A is a 3-dimensional surface plot of a comparative stretchable laminate with a buckled surface due to improper elastic fiber spacing.

The outermost surface of the laminate is shown in FIG. 12A and visible buckling is shown. When the normalized Ra was determined, and is shown in FIG. 12B, there were peaks that exceeded 25 micrometers and this confirms the presence of buckling. The buckling is a result of the poor fiber spacing. The thickness of the stretched laminate was 0.238 mm, the average MVTR was 12199.9 g/m$^2$/24 hr, the Suter test result was pass/pass/pass, the percent elongation was 55.6%, and percent recovery was 96.3%, as shown in FIG. 17.

EXAMPLE 3

Inventive Stretchable Laminate

A length of 146 g/m$^2$ polyester woven material (Style 758680 (US440) from Milliken & Company, Spartanburg, SC), a quantity of elastane fibers (300 denier, Type 902C from Invista, Wichita, KS), and a length of polyurethane-coated ePTFE membrane were obtained. The ePTFE membrane had the following properties: thickness=0.043 mm, density=0.41 grams per cubic centimeter (g/cc), matrix tensile strength in the length direction=31×10$^6$ MegaPascal (MPa), matrix tensile strength in the width direction=93×10$^6$ MPa, Bubble Point=1.5×10$^5$ MPa. Polyurethane (PU) was applied by coating the ePTFE membrane and allowing it to at least partially penetrate the pores of the membrane, then cured.

The elastane fibers were loaded onto a beam and fed through two reeds, each at a spacing of 20 dents per centimeter (cm). Another polyurethane was obtained and loaded in the printer to add adhesive dots to the ePTFE side of the polyurethane-coated ePTFE membrane. Dots of 335 micron diameter were applied at a percent area coverage of 54% to the ePTFE membrane. The woven material was placed onto the adhesive side of the membrane, while the elastane fibers were tensioned to 250% elongation and inserted between the ePTFE membrane and woven material. The first reed was mounted approximately 7 cm from the lamination nip, adjacent to the woven material. The second reed was mounted approximately 15 cm from the lamination nip and shifted laterally with respect to the first reed by 5 cm. While retaining the tension on the elastane fibers, the resulting laminate was spooled onto a roll and allowed to cure, which required approximately 2 days. Following curing, the laminate was unspooled and allowed to relax, thereby returning to an unstretched state.

Figure 13B:
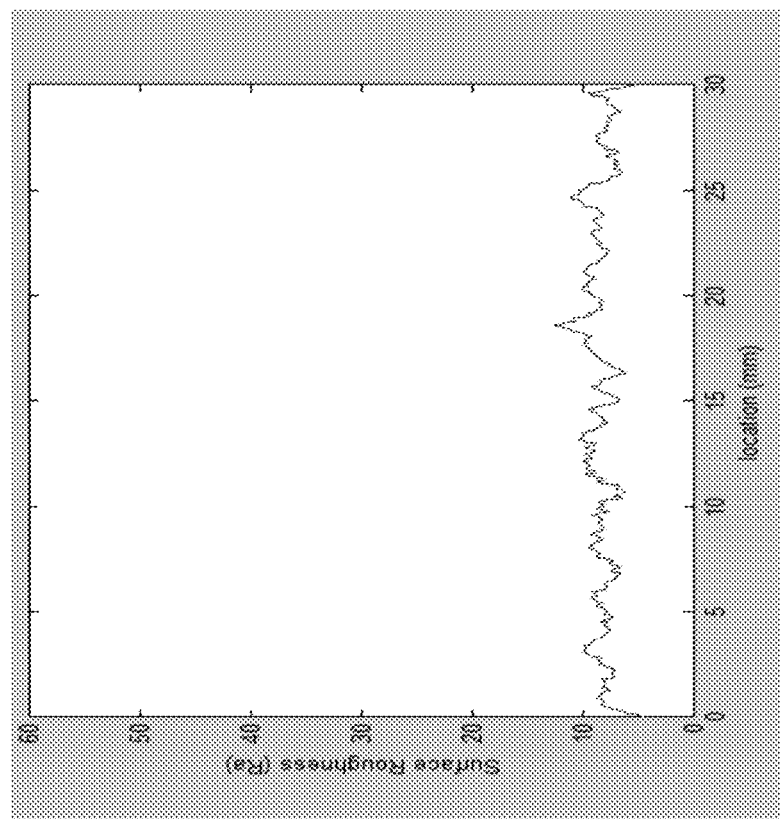
FIG. 13B is a graph of normalized surface roughness (Ra) measurements across the surface of a stretchable laminate of the present invention.
Figure 13A:
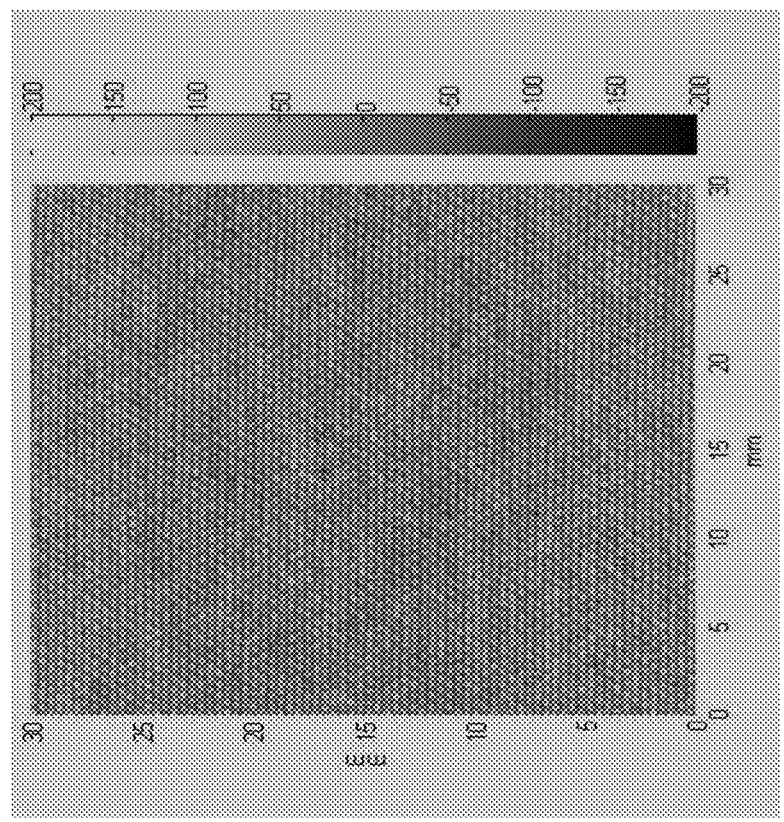
FIG. 13A is a 3-dimensional surface plot of a stretchable laminate of the present invention.

The surface topography of the outermost surface of the laminate is shown in FIG. 13A. Normalized Ra was determined, and is shown in FIG. 13B. The thickness of the stretched laminate was 0.470 mm, the average MVTR was 12490.5 g/m$^2$/24 hr, the Suter test result was pass/pass/pass, the percent elongation was 34.4%, and percent recovery was 96.5%, as shown in FIG. 17.

EXAMPLE 4

Comparative Functional Laminate

A length of 146 g/m$^2$ polyester woven material (Style 758680 (US440) from Milliken & Company, Spartanburg, SC), a quantity of elastane fibers (300 denier, Type 902C from Invista, Wichita, KS), and a length of polyurethane-coated ePTFE membrane were obtained. The ePTFE membrane had the following properties: thickness=0.043 mm, density=0.41 grams per cubic centimeter (g/cc), matrix tensile strength in the length direction=31×10$^6$ MegaPascal (MPa), matrix tensile strength in the width direction=93×10$^6$ MPa, Bubble Point=1.5×10$^5$ MPa. Polyurethane (PU) was applied by coating the ePTFE membrane and allowing it to at least partially penetrate the pores of the membrane, then cured.

The elastane fibers were loaded onto a beam and fed through one reed having a spacing of 13 dents per centimeter (cm). Another polyurethane was loaded in the printer to add adhesive dots to the ePTFE side of the polyurethane-coated ePTFE membrane. Dots of 500 micron diameter were applied at a percent area coverage of 39% to the ePTFE membrane. The woven material was placed onto the adhesive side of the membrane, while the elastane fibers were tensioned to 250% elongation and inserted between the ePTFE membrane and woven material. The reed was mounted approximately 15 cm from the lamination nip, adjacent to woven material. While retaining the tension on the elastane fibers, the resulting laminate was spooled onto a roll and allowed to cure, which required approximately 2 days. Following curing, the laminate was unspooled and allowed to relax, thereby returning to an unstretched state.

Figure 14A:
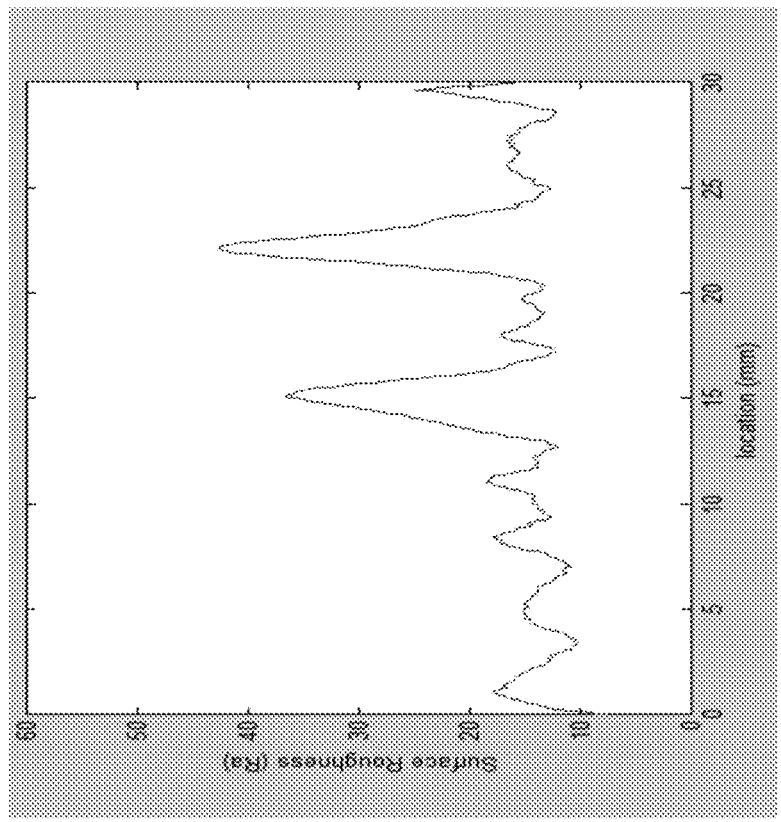
FIG. 14A is a 3-dimensional surface plot of a comparative stretchable laminate with a buckled surface due to improper elastic fiber spacing.
Figure 14B:
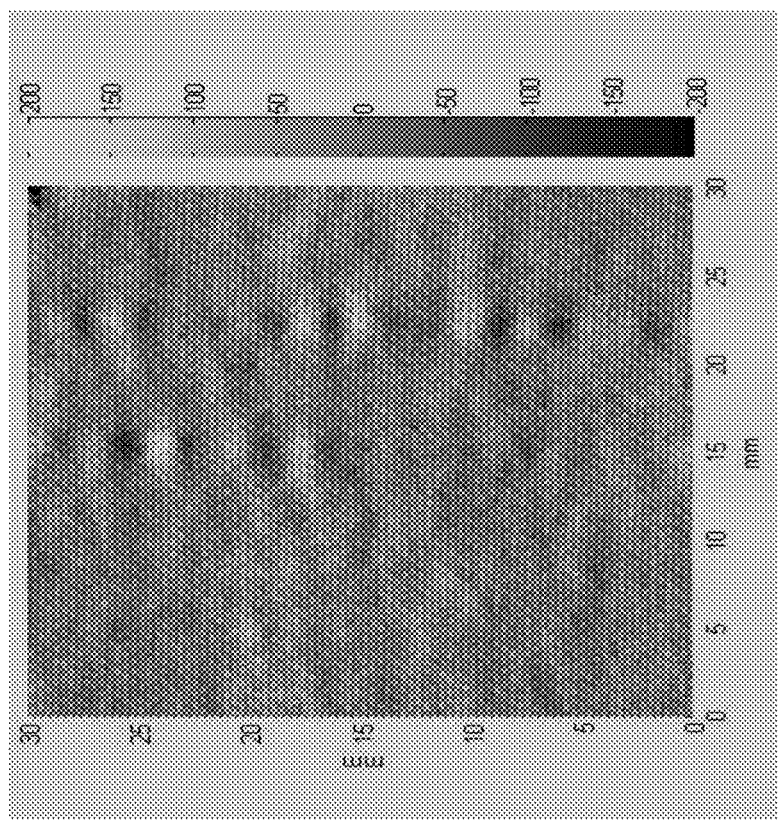
FIG. 14B is a graph of normalized Ra measurements across the surface of a stretchable laminate with a buckled surface.

The outermost surface of the laminate is shown in FIG. 14A and visible buckling is shown. When the normalized Ra was determined, and is shown in FIG. 14B, there were peaks that exceeded 25 micrometers and this confirms the presence of buckling. The buckling is a result of the poor fiber spacing.

EXAMPLE 5

Comparative Functional Laminate

A length of 88 g/m$^2$ nylon woven material (Style 7820 (NUERO058P) from Toray Textiles Europe Ltd, Crown Farm Way, Forest Town, Mansfield NG19 0FT, United Kingdom), a quantity of elastane fibers (120 denier, Type 902C from Invista, Wichita, KS), and a length of polyurethane-coated ePTFE membrane were obtained. The ePTFE membrane had the following properties: thickness=0.043 mm, density=0.41 grams per cubic centimeter (g/cc), matrix tensile strength in the length direction=31×10$^6$ MegaPascal (MPa), matrix tensile strength in the width direction=93×10$^6$ MPa, Bubble Point=1.5×10$^5$ MPa. Polyurethane (PU) was applied by coating the ePTFE membrane and allowing it to at least partially penetrate the pores of the membrane, then cured.

The elastane fibers were loaded onto a beam and fed through one reed having a spacing of 20 dents per centimeter (cm). Another polyurethane was obtained and loaded in the printer to add adhesive dots to the ePTFE side of the polyurethane-coated ePTFE membrane. Dots of 500 micron diameter were applied at a percent area coverage of 39% to the ePTFE membrane. The woven material was placed onto the adhesive side of the membrane, while the elastane fibers were tensioned to 250% elongation and inserted between the ePTFE membrane and woven material. The reed was mounted approximately 15 cm from the lamination nip, adjacent to woven material. While retaining the tension on the elastane fibers, the resulting laminate was spooled onto a roll and allowed to cure, which required approximately 2 days. Following curing, the laminate was unspooled and allowed to relax, thereby returning to an unstretched state.

Figure 15B:
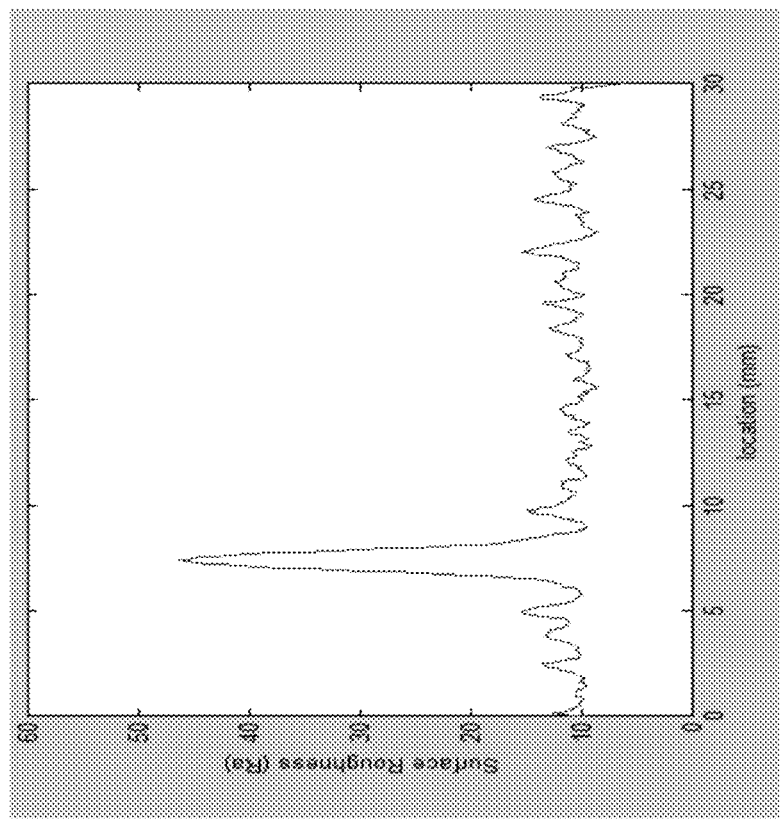
FIG. 15B is a graph of normalized Ra measurements across the surface of a stretchable laminate with a buckled surface.
Figure 15A:
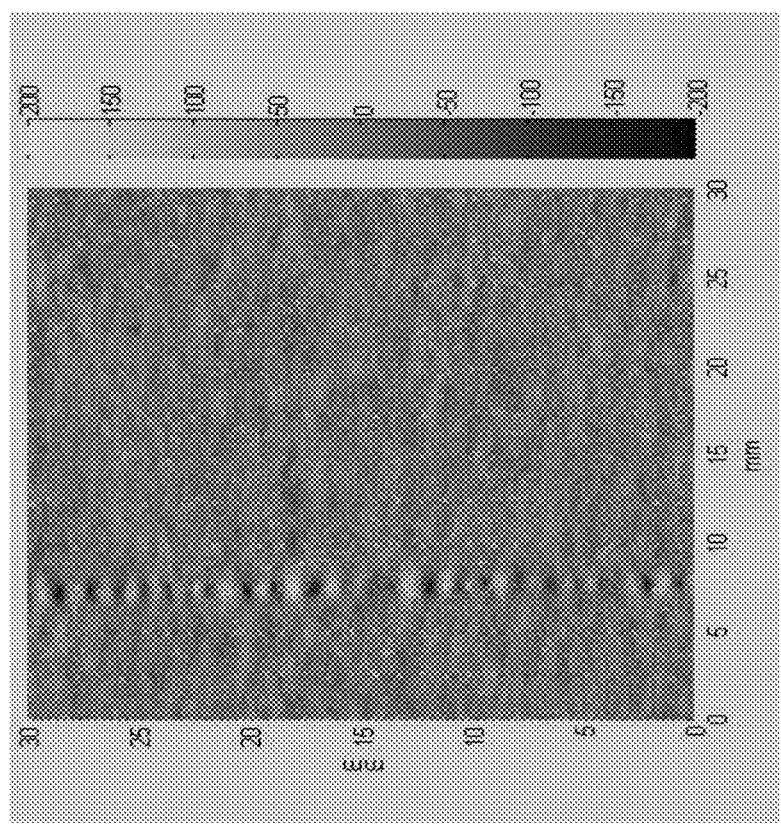
FIG. 15A is a 3-dimensional surface plot of a comparative stretchable laminate with a buckled surface due to improper elastic fiber spacing.

The surface topography of the outermost surface of the laminate is shown in FIG. 15A. Normalized Ra was determined, and is shown in FIG. 15B. The thickness of the stretched laminate was 0.388 mm, the average MVTR was 11830.2 g/m$^2$/24 hr, the Suter test result was pass/pass/pass, the percent elongation was 70.1%, and percent recovery was 97.6%, as shown in FIG. 17.

EXAMPLE 6

Inventive Functional Laminate

A length of 92 g/m$^2$ polyester knit material (Style 45627 (PIQE001MO) from MYBE Srl, Via alla Selva 596, Cassina Rizzardi, Italy), a quantity of elastane fibers (120 denier, Type 902C from Invista, Wichita, KS), and a length of polyurethane-coated ePTFE membrane were obtained. The ePTFE membrane had the following properties: thickness=0.043 mm, density=0.41 grams per cubic centimeter (g/cc), matrix tensile strength in the length direction=31×10$^6$ MegaPascal (MPa), matrix tensile strength in the width direction=93×10$^6$ MPa, Bubble Point=1.5×10$^5$ MPa. Polyurethane (PU) was applied by coating the ePTFE membrane and allowing it to at least partially penetrate the pores of the membrane, then cured.

The elastane fibers were loaded onto a beam and fed through two reeds, each at a spacing of 20 dents per centimeter (cm). Another polyurethane was loaded in the printer to add adhesive dots to the ePTFE side of the polyurethane-coated ePTFE membrane. Dots of 335 micron diameter were applied at a percent area coverage of 54% to the ePTFE membrane. The woven material was placed onto the adhesive side of the membrane, while the elastane fibers were tensioned to 250% elongation and inserted between the ePTFE membrane and woven material. The first reed was mounted approximately 7 cm from the lamination nip, adjacent to the woven material. The second reed was mounted approximately 15 cm from the lamination nip and shifted laterally with respect to the first reed by 5 cm. While retaining the tension on the elastane fibers, the resulting laminate was spooled onto a roll and allowed to cure, which required approximately 2 days. Following curing, the laminate was unspooled and allowed to relax, thereby returning to an unstretched state.

Figure 16A:
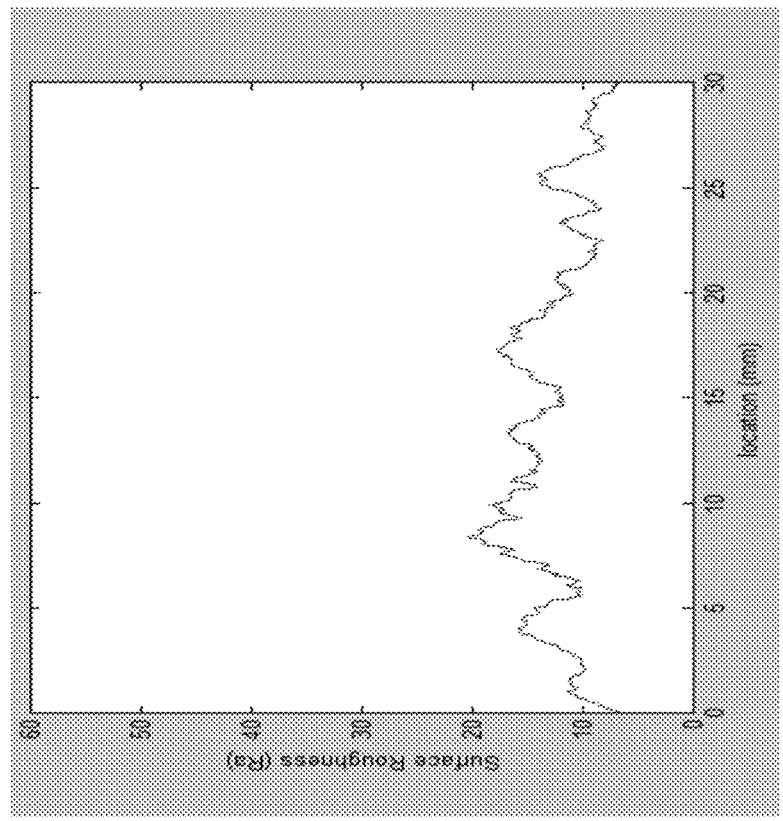
FIG. 16A is a 3-dimensional surface plot of a stretchable laminate of the present invention.
Figure 16B:
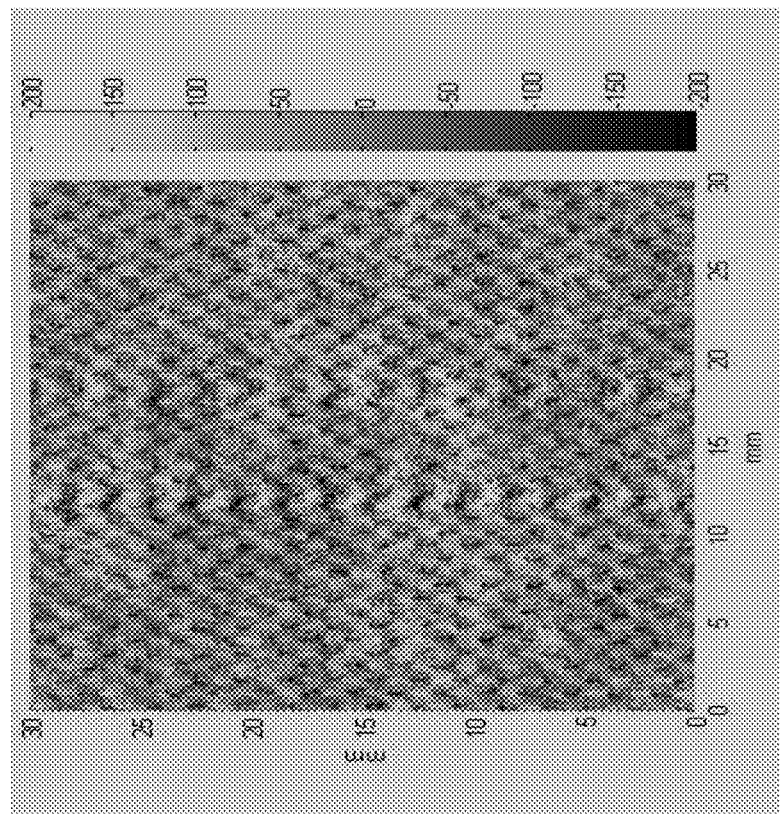
FIG. 16B is a graph of normalized surface roughness (Ra) measurements across the surface of a stretchable laminate of the present invention.

The flat surface topography of the outermost surface of the laminate is shown in FIG. 16A. Normalized Ra was determined, and is shown in FIG. 16B. The thickness of the stretched laminate was 0.757 mm, the average MVTR was 12359.8 g/m$^2$/24 hr, the Suter test result was pass/pass/pass, the percent elongation was 74.9%, and percent recovery was 93.3%, as shown in FIG. 17.

EXAMPLE 7

Maximum Fiber Spacing

Figure 18:
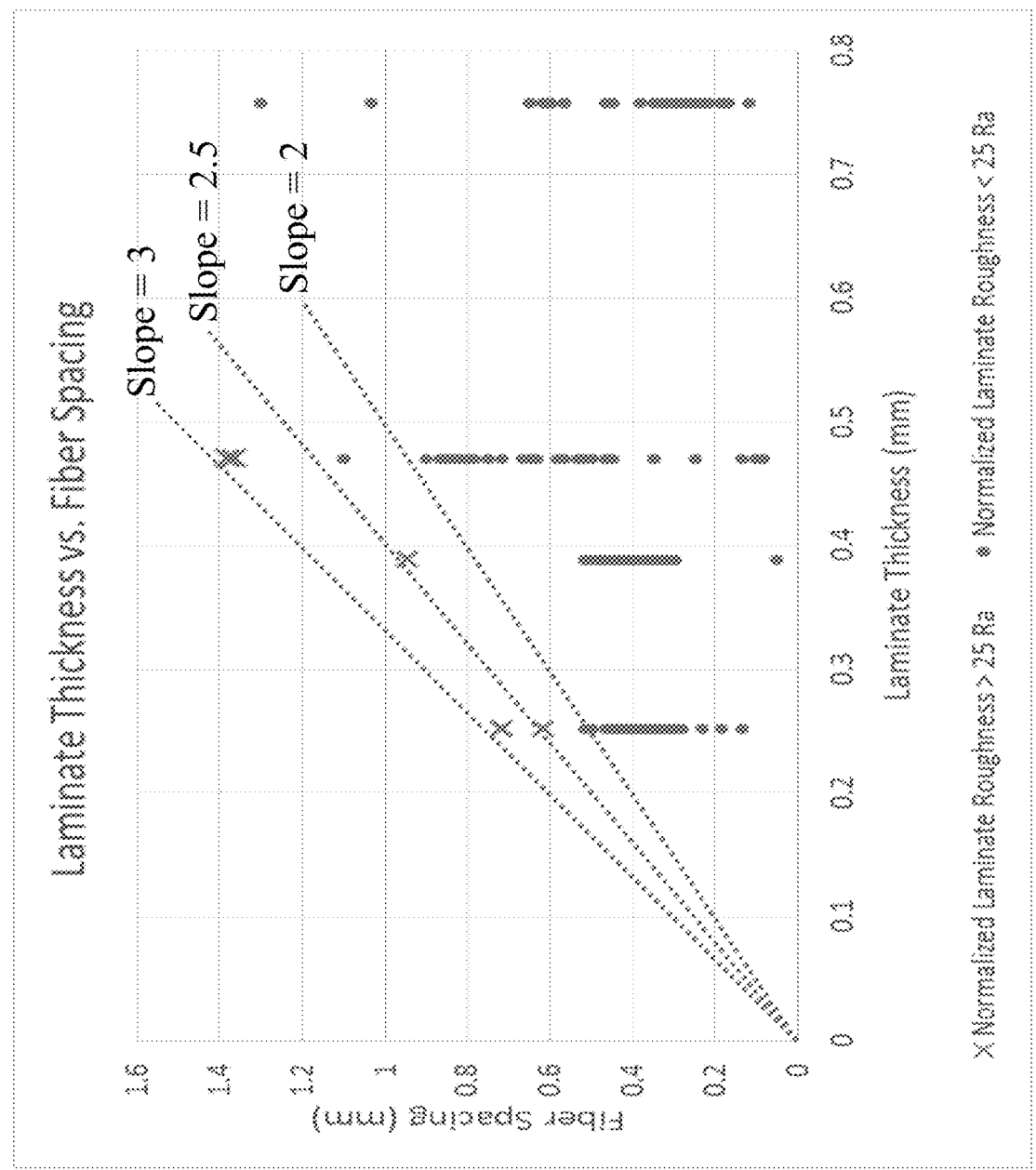
FIG. 18 is a graph of laminate thickness vs. fiber spacing and correlates fiber spacing to normalized Ra values.

FIG. 18 shows the maximum fiber spacing for different stretchable laminates having different thickness: 0.25 mm, 0.39 mm, 0.47 mm, and 0.76 mm. The fiber spacing was varied between 0.01 and 1.4 mm. Three trendlines are shown for different maximum fiber spacing: 3.0, 2.5 and 2.0. Laminates having buckling (Ra>25) are shown by X, while those being substantially free of buckling (Ra<=25) are shown by dots.

EXAMPLE 8

Inventive Stretchable Laminate

Two lengths of 88 g/m$^2$ nylon woven material (Style 7820 (NUER0058P) from Toray Textiles Europe Ltd, Crown Farm Way, Forest Town, Mansfield NG19 0FT, United Kingdom) and a quantity of elastane fibers (120 denier, Type 902C from Invista, Wichita, KS) were obtained.

The elastane fibers were loaded onto a beam and fed through two reeds, each at a spacing of 20 dents per centimeter (cm). A polyurethane was obtained and loaded in the printer to add adhesive dots to the first length of woven material. Dots of 305 micron diameter were applied at a percent area coverage of 83% to the ePTFE membrane. The second length of woven material was placed onto the adhesive side of the first length of woven material, while the elastane fibers were tensioned to 250% elongation and inserted between the first and second woven materials. The first reed was mounted approximately 7 cm from the lamination nip, adjacent to the woven material. The second reed was mounted approximately 15 cm from the lamination nip and shifted laterally with respect to the first reed by 2 cm. While retaining the tension on the elastane fibers, the resulting laminate was spooled onto a roll and allowed to cure, which required approximately 2 days. Following curing, the laminate was unspooled and allowed to relax, thereby returning to an unstretched state.

The thickness of the stretched laminate was 0.466 mm and the visual surface appearance of the laminate was virtually identical to the surface appearance of the unlaminated woven material. The percent elongation was 41.8%, and percent recovery was 98.3%

EXAMPLE 9

Inventive Stretchable Laminate

A length of 67 g/m$^2$ nylon woven material (Style 130970 (MI187R) from Milliken & Company, Spartanburg, SC), a quantity of elastane fibers (120 denier, Type 902C from Invista, Wichita, KS), a length of polyurethane-coated ePTFE membrane and a length of 37.3 g/m$^2$ polyester knit having a loop and chevron side (Style A1012 from Glen Raven, Inc., Glen Raven, NC) were obtained. Polyurethane (PU) was applied by coating the ePTFE membrane and allowing it to at least partially penetrate the pores of the membrane, then cured. The coated ePTFE membrane had a mass of 32 grams per square meter (g/m$^2$) and thickness of 0.032 mm.

Another polyurethane was obtained and loaded in the printer to add adhesive dots to the coated side of the polyurethane-coated ePTFE membrane. Dots of 335 micron diameter were applied at a percent area coverage of 54% to the ePTFE membrane. The chevron side of the knit material was placed onto the adhesive side of the membrane. The resulting laminate was spooled onto a roll and allowed to cure, which required approximately 2 days.

The elastane fibers were loaded onto a beam and fed through two reeds, each at a spacing of 20 dents per centimeter (cm). Another polyurethane was obtained and loaded in the printer to add adhesive dots to the ePTFE side of the polyurethane-coated ePTFE membrane and knit laminate. Dots of 335 micron diameter were applied at a percent area coverage of 54% to the ePTFE membrane. The woven material was placed onto the adhesive side of the membrane and knit laminate, while the elastane fibers were tensioned to 250% elongation and inserted between the ePTFE membrane and woven material. The first reed was mounted approximately 7 cm from the lamination nip, adjacent to the woven material. The second reed was mounted approximately 15 cm from the lamination nip and shifted laterally with respect to the first reed by 5 cm. While retaining the tension on the elastane fibers, the resulting laminate was spooled onto a roll and allowed to cure, which required approximately 2 days. Following curing, the laminate was unspooled and allowed to relax. The untensioned laminate was then placed in an oven at 170° C. for 60 s, allowing additional relaxation.

The thickness of the stretched laminate was 0.398 mm and the visual surface appearance of the laminate on the woven side was virtually identical to the surface appearance of the unlaminated woven material. The percent elongation was 31.4%, and percent recovery was 99.8%.

What is claimed is:

1. A stretchable laminate comprising:
   (a) a textile layer having a first surface and a second surface; and
   (b) a fiber layer disposed on a first surface of the textile layer;
      (i) wherein the fiber layer comprises a plurality of elastic fibers,
      (ii) wherein the plurality of elastic fibers are disposed in a substantially parallel arrangement on the first surface of the textile layer, and
      (iii) wherein at least 80% of the plurality of elastic fibers have an adjacent fiber spacing distance that is less than 2.5 times a thickness of the stretchable laminate in a stretched state;
   wherein the stretchable laminate has an elasticity greater than an elasticity of the textile layer,
   wherein the stretchable laminate has a recovery of at least 80% after an elongation of at least 10% in a direction of the elastic fibers, and
   wherein the second surface of the textile layer has a maximum normalized surface roughness (Ra) of less than or equal to 25 micrometers.

2. The stretchable laminate of claim 1, wherein a maximum distance between adjacent fibers does not exceed 2.5 times the thickness of the stretchable laminate.

3. The stretchable laminate of claim 1, wherein the plurality of elastic fibers are spaced apart at an internal distance from 0.1 to 1.5 mm.

4. The stretchable laminate of claim 1, further comprising an adhesive layer disposed between the plurality of elastic fibers and the textile layer.

5. The stretchable laminate of claim 1, wherein a material of the textile layer has an elongation of less than 15% when measured according to ASTM test method D 5035-06.

6. The stretchable laminate of claim 1, wherein the textile layer is a non-elastic material.

7. The stretchable laminate of claim 1, wherein a material of the textile layer includes at least one of cotton, silk, cellulose, wool, polyamides, polyolefins, polyacrylates, polyesters, polyurethanes, fluoropolymers, copolymers or a combination thereof.

8. The stretchable laminate of claim 1, wherein the plurality of elastic fibers comprise at least one of natural rubber, polybutadiene, elastomeric polyolefins, polyurethanes, silicones, fluoroelastomers, elastanes, block co-polymers containing polyesters, a polyester-polyurethane, a polyamide, or a combination thereof.

9. The stretchable laminate of claim 1, wherein a denier of the plurality of elastic fibers is less than or equal to 400 denier.

10. The stretchable laminate of claim 1, further comprising a second textile layer, wherein the second textile layer is disposed on the first or second surface of the textile layer.

11. The stretchable laminate of claim 10, wherein a surface of the second textile layer has an average normalized surface roughness (Ra) of less than or equal to 25 micrometers.

12. The stretchable laminate of claim 1, wherein a maximum normalized surface roughness (Ra) of the second surface of the textile layer is no more than 50% larger than an average normalized surface roughness (Ra) of the second surface of the textile layer.

13. A garment comprising the stretchable laminate of claim 1.

* * * * *